United States Patent
Ohmuro et al.

(10) Patent No.: US 10,101,442 B2
(45) Date of Patent: Oct. 16, 2018

(54) DISTANCE MEASURING APPARATUS AND METHOD FOR CALIBRATION

(71) Applicant: NIKON VISION CO., LTD., Tokyo (JP)

(72) Inventors: Hitoshi Ohmuro, Tokyo (JP); Takao Takizawa, Yokohama (JP); Yosuke Miyazaki, Ichihara (JP)

(73) Assignee: NIKON VISION CO., LTD., Tokyo (JP)

( * ) Notice: Subject to any disclaimer, the term of this patent is extended or adjusted under 35 U.S.C. 154(b) by 531 days.

(21) Appl. No.: 14/834,955

(22) Filed: Aug. 25, 2015

(65) Prior Publication Data

US 2015/0362588 A1   Dec. 17, 2015

Related U.S. Application Data

(63) Continuation of application No. PCT/JP2014/000993, filed on Feb. 25, 2014.

(30) Foreign Application Priority Data

Feb. 25, 2013 (JP) .................... 2013-034223
Feb. 25, 2013 (JP) .................... 2013-034328

(51) Int. Cl.
*G01C 3/08* (2006.01)
*G01S 7/497* (2006.01)
(Continued)

(52) U.S. Cl.
CPC .............. *G01S 7/497* (2013.01); *G01S 7/481* (2013.01); *G01S 7/51* (2013.01); *G01S 17/023* (2013.01); *G01S 17/10* (2013.01)

(58) Field of Classification Search
CPC . G01S 7/497; G01S 7/481; G01S 7/51; G01S 17/023; G01S 17/10
See application file for complete search history.

(56) References Cited

U.S. PATENT DOCUMENTS

8,797,511 B2   8/2014 Tiefenthaler et al.
2010/0157282 A1   6/2010 Arai et al.

FOREIGN PATENT DOCUMENTS

JP   2000-187151   7/2000
JP   2001-59724    3/2001
(Continued)

OTHER PUBLICATIONS

International Preliminary Report on Patentability and Written Opinion of the International Searching Authority dated Sep. 3, 2015 in corresponding International Patent Application No. PCT/JP2014/000993.
(Continued)

*Primary Examiner* — Samantha K Abraham

(57) ABSTRACT

A distance measuring apparatus includes: a light-transmitting unit that transmits signal light from a light source toward a target object; a light-receiving unit that has a light-receiving element and receives the signal light from the target object on an optical axis different from that of the light-transmitting unit; a distance measuring unit that measures a distance to the target object based on propagation time from light transmission to light reception of the signal light; and a compensating unit that, while either optical path of an optical path from the light-transmitting unit to the light-receiving unit or an optical path from the target object to the light-receiving element is fixed, compensates an optical path of the signal light by displacing the other optical path at the light-transmitting unit or the light-receiving unit.

20 Claims, 30 Drawing Sheets

(51) Int. Cl.
*G01S 7/51* (2006.01)
*G01S 17/02* (2006.01)
*G01S 17/10* (2006.01)
*G01S 7/481* (2006.01)

(56) References Cited

FOREIGN PATENT DOCUMENTS

| | | |
|---|---|---|
| JP | 2009-270856 | 11/2009 |
| JP | 2009270856 A * | 11/2009 |
| WO | WO 2009/031550 A1 | 3/2009 |

OTHER PUBLICATIONS

International Search Report dated May 20, 2014 in corresponding international application PCT/JP2014/000993.

* cited by examiner

DISTANCE MEASURING APPARATUS AND METHOD FOR CALIBRATION

CROSS-REFERENCE TO RELATED APPLICATIONS

This application is a continuation application filed under 35 U.S.C. § 111(a), of International Application PCT/JP2014/000993, filed Feb. 25, 2014, which is based on and claims foreign priority benefit to Japanese Patent Application No. 2013-034223 filed Feb. 25, 2013, and Japanese Patent Application No. 2013-034328 filed Feb. 25, 2013, the contents of which are incorporated herein by reference.

BACKGROUND

1. Technical Field

The present invention relates to a distance measuring apparatus and a calibration method.

2. Related Art

There is a distance measuring apparatus that measures a distance to a target object based on propagation time of signal light reflected on the target object (for example, see Patent Document 1).

[Patent Document 1] WO2009/31550

In some cases, due to an image blur, it is difficult to sight an intended target object and measure a distance to the target object with a distance measuring apparatus.

SUMMARY

A first aspect of the present invention provides a distance measuring apparatus including: a light-transmitting unit that transmits signal light from a light source toward a target object; a light-receiving unit that has a light-receiving element and receives the signal light from the target object on an optical axis different from that of the light-transmitting unit; a distance measuring unit that measures a distance to the target object based on propagation time from light transmission to light reception of the signal light; and a compensating unit that, while either optical path of an optical path from the light-transmitting unit to the light-receiving unit or an optical path from the target object to the light-receiving element is fixed, compensates an optical path of the signal light by displacing the other optical path at the light-transmitting unit or the light-receiving unit.

A second aspect of the present invention provides a calibration method for calibrating a distance measuring apparatus including: a light-transmitting unit that transmits signal light from a light source toward a target object; a light-receiving unit that has a light-receiving element and receives the signal light from the target object on an optical axis different from that of the light-transmitting unit; a distance measuring unit that measures a distance to the target object based on propagation time from light transmission to light reception of the signal light; and a compensating unit that, while an optical path of one of the light-transmitting unit and the light-receiving unit is fixed, compensates an optical path of the signal light by displacing an optical path of the other of the light-transmitting unit and the light-receiving unit, the method including: measuring incoming light intensity, in the light-receiving unit, of the signal light reflected on a known standard target object while displacing the optical path; and deciding an initial position of the optical path by displacing the optical path.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
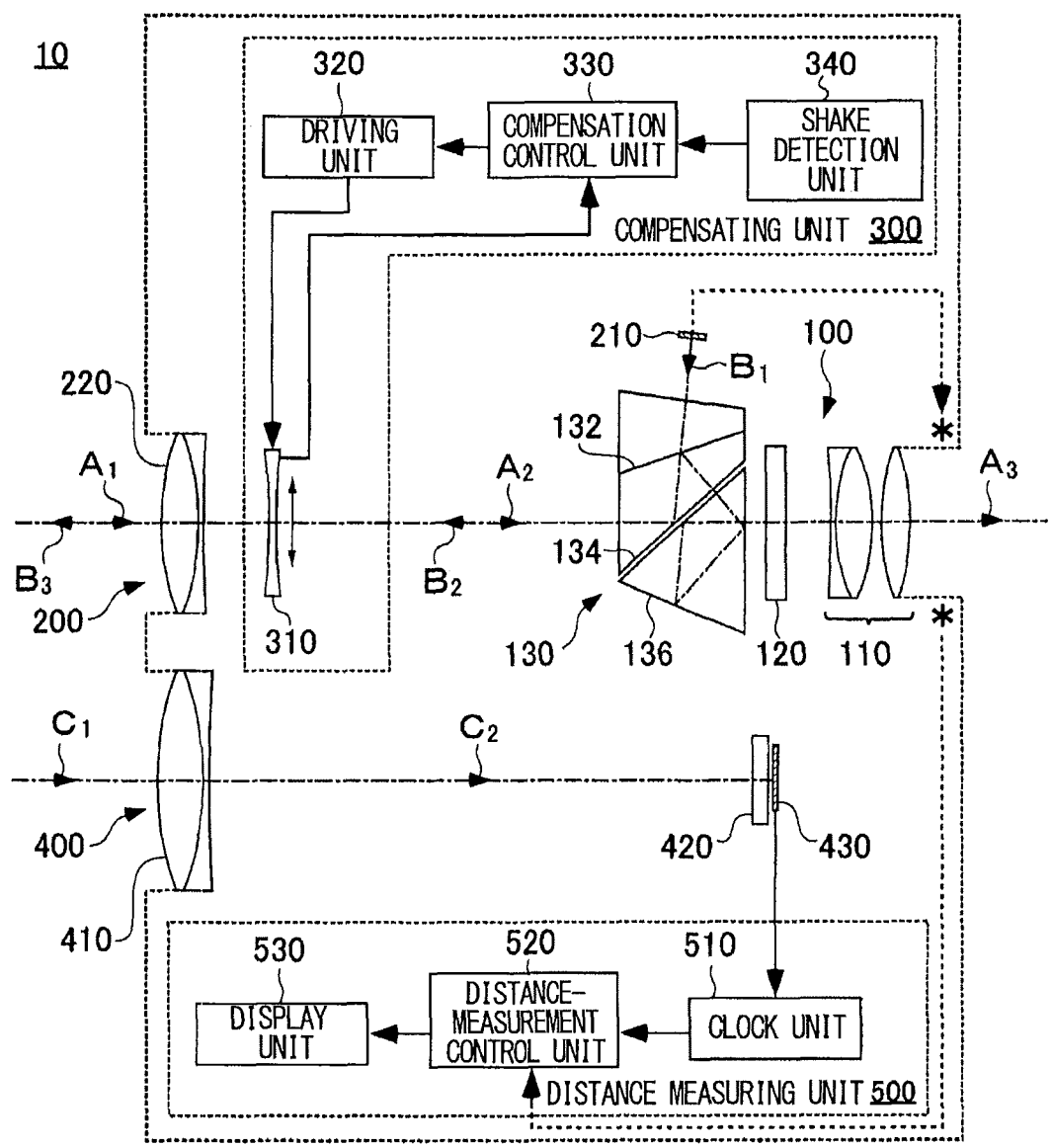
FIG. 1 is a schematic cross-sectional view of a distance measuring apparatus 10.

FIG. 1 is a schematic cross-sectional view of a distance measuring apparatus 10. The distance measuring apparatus 10 includes a sighting unit 100, a light-transmitting unit 200, a compensating unit 300, a light-receiving unit 400 and a distance measuring unit 500. Note that in the following explanation, the side of the distance measuring apparatus 10 on which the sighting unit 100 is placed is the rear side. Also, the side of the distance measuring apparatus 10 that faces a target of distance measurement is the front side.

The sighting unit 100 includes an eyepiece optical system 110, a reticle plate 120 and an erecting prism 130. Also, the sighting unit 100 shares an object optical system 220 and a compensating member 310 with the light-transmitting unit 200 and the compensating unit 300, respectively.

The rear end of the eyepiece optical system 110 is exposed at the rear end surface of the distance measuring apparatus 10. The front end of the eyepiece optical system 110 faces the rear end of the erecting prism 130 inside the distance measuring apparatus 10. A user of the distance measuring apparatus 10 sights the distance measuring apparatus 10 by viewing an image of a target object through the eyepiece optical system 110.

The reticle plate 120 has a reticle formed by printing, etching or the like on a plate that is transparent to visible light. The reticle has a sighting index such as cross-hairs, a rectangular frame, a circular frame or the like. The user of the distance measuring apparatus 10 sights the distance measuring apparatus 10 relative to a target object by superimposing the sighting index of the reticle on an image observed through the eyepiece optical system 110. A display image of a transmissive liquid crystal display panel may be used as the reticle.

The erecting prism 130 has a dichroic reflection surface 132 that reflects the visible light band and allows transmission of the infrared band, and total reflection surfaces 134, 136 that have high reflectance for the visible light band and the infrared band. The erecting prism 130 has another reflection surface which is not provided with a reference number and reverses an inverted mirror image formed by an incident beam into an erect normal image. The erecting prism 130 can be formed by using a Dach prism, a Porro prism or the like.

The light-transmitting unit 200 has a light-emitting unit 210 and the object optical system 220. Also, the light-transmitting unit 200 shares part of the erecting prism 130 including the dichroic reflection surface 132 and the total reflection surface 134 with the sighting unit 100. Also, the light-transmitting unit 200 shares the compensating member 310 with the compensating unit 300.

The light-emitting unit 210 includes a light-emitting element such as a semiconductor laser as a light source, and emits pulsed signal light when the distance measuring apparatus 10 performs a distance measurement operation. In the present embodiment, signal light is infrared light, for example, The object optical system 220 is disposed at the front end of the distance measuring apparatus 10, and faces a target object whose front side end surface is a target of distance measurement. The rear side end surface of the object optical system 220 faces the front side end surface of the erecting prism 130 with the compensating member 310 being sandwiched therebetween. Note that the compensating member 310 is also an optical member, and forms a light-transmitting optical system together with the object optical system 220.

Note that the wavelength of the signal light may be another wavelength other than the visible band such as an ultraviolet ray. When the signal light is an ultraviolet ray, the dichroic reflection surface 132 of the erecting prism 130 reflects the visible light band and allows transmission of the ultraviolet band. Also, the total reflection surface 134 reflects the visible light band and the ultraviolet band.

The compensating unit 300 includes the compensating member 310 and a driving unit 320. The compensating member 310 includes a lens constituting part of the eyepiece optical system 110 and the object optical system 220. The driving unit 320 displaces the compensating member 310 in a direction to cross the optical axis of the compensating member 310. Furthermore, the driving unit 320 may swing the compensating member 310 in a direction in which the principal surface swings.

Note that other than a lens that is displaced, a prism that swings may be used as the compensating member 310. Also, an apex angle-variable prism whose apex angle formed between an entrance surface and an exit surface can be changed by swinging a member forming the entrance surface or the exit surface can be used as the compensating member 310. A voice coil motor, a piezoelectric motor or the like can be used as the driving unit 320.

Among light reflected or scattered from a target object located in front of the distance measuring apparatus 10, a beam $A_1$ that is propagated within a range of the angle of view of the object optical system 220 enters the distance measuring apparatus 10 through the object optical system 220. The beam $A_1$ is transmitted through the compensating member 310, is propagated as a beam $A_2$ backward inside the distance measuring apparatus 10, and is emitted as a beam $A_3$ backward from the distance measuring apparatus 10 through the erecting prism 130, the reticle plate 120, and the eyepiece optical system 110. Thereby, the user can observe an erect normal image of a target object through the eyepiece optical system 110.

The reticle disposed on the reticle plate 120 is superimposed on an image of the target object that the user observes through the eyepiece optical system 110. Therefore, the user can sight the distance measuring apparatus 10 by matching the reticle with the target object by displacing the distance measuring apparatus 10.

Note that an optical member to change the focal distance of the eyepiece optical system 110 may be provided as part of the eyepiece optical system 110 or in addition to the eyepiece optical system 110. Thereby, the user can observe a clear image regardless of the distance to the target object. Also, diopter compensation according to the eyesight of the user can be performed.

The user instructs the distance measuring apparatus 10 to start a distance measurement operation for example by switch manipulation of a button or the like provided to the distance measuring apparatus 10. When the user instructs the distance measuring apparatus 10 to measure a distance, the light-emitting unit 210 emits pulsed signal light as a beam $B_1$ toward the upper surface of the erecting prism 130 in the figure. In the erecting prism 130, the signal light is transmitted through the dichroic reflection surface 132, is reflected on the total reflection surface 134, and is propagated as a beam $B_2$ forward inside the distance measuring apparatus 10.

Furthermore, the signal light is projected as a beam $B_3$ externally forward from the distance measuring apparatus 10 through the compensating member 310 and the object optical system 220. The signal light projected as the beam $B_3$ is projected onto the target object of distance measurement that has been sighted by the user. When the distance to the target object of distance measurement is assumed to be several hundred meters, the spread of the projected signal light may be set to approximately ±0.05° for example.

Note that an optical member to change the focal distance of the object optical system 220 may be provided as part of the object optical system 220 or in addition to the object optical system 220. Thereby, a clearer image can be observed in the sighting unit 100, and the target object to be a target of distance measurement can be selected accurately by narrowing the beam diameter of the signal light.

The compensating member 310 allows transmission of the beam $A_2$ that has entered into the distance measuring apparatus 10 and the beam $B_2$ emitted from the distance measuring apparatus 10 near the object optical system 220. When the optical axis of the compensating member 310 is displaced by being driven by the driving unit 320, the optical path of each of the beams $A_2$, $B_2$ is displaced, and its propagation direction changes.

By the propagation direction of the beam $A_2$ being displaced, an image observed by the user through the sighting unit 100 is displaced. In other words, by appropriately displacing the compensating member 310 when the distance measuring apparatus 10 is displaced, a blur of an image observed by the user can be stopped. Also, by appropriately displacing the compensating member 310 according to a distance from the distance measuring apparatus 10 to a target object of distance measurement, a parallax between the optical system of the light-transmitting unit 200 and the optical system of the light-receiving unit 400 can be compensated.

Furthermore, by displacing the propagation direction of the beam $B_2$ when the optical axis of the compensating member 310 is displaced, the propagation direction of the beam $B_3$ of the signal light projected externally is displaced. Therefore, by appropriately displacing the compensating member 310 when the distance measuring apparatus 10 is displaced, the irradiation target of the signal light can be maintained.

The light-receiving unit 400 has an object optical system 410, a band transmitting filter 420, and a light-receiving element 430 and forms a light-receiving optical system. The object optical system 410 of the light-receiving unit 400 has an optical axis that is different from that of the object optical system 220 of the light-transmitting unit 200.

The band transmitting filter 420 and the light-receiving element 430 are sequentially disposed behind the object optical system 410. The band transmitting filter 420 has a property of allowing transmission of light in a narrow band including signal light and blocking or attenuating light of other bands. The light-receiving element 430 includes a photoelectric conversion element such as a photodiode or a phototransistor that is sensitive to the band of signal light. Thereby, the light-receiving element 430 detects signal light that has entered thereto, and generates an electrical signal corresponding to the signal light detected.

The beam $B_1$ reflected or scattered from a target object located in front of the distance measuring apparatus 10 enters the object optical system of the light-receiving unit 400. The beam $B_1$ is propagated as the beam $B_2$ backward inside the distance measuring apparatus 10, and is received by the light-receiving element 430 after being transmitted through the band transmitting filter 420.

Therefore, the light-receiving element 430 detects the signal light included in the beams $B_1$, $B_2$ that have entered thereto at a high SN ratio, and generates an electrical signal. The electrical signal generated by the light-receiving element 430 is input to the distance measuring unit 500.

Note that preferably the light-receiving area of the light-receiving element 430 is smaller in terms of excluding influence of background light in detection of signal light. An optical member to change the focal distance of the object optical system 410 may be provided as part of the object optical system 410 or in addition to the optical system. Thereby, the light-receiving element 430 can be allowed to receive smaller spot light by narrowing the beam diameter of the signal light received.

In the distance measuring apparatus 10, the distance measuring unit 500 has a clock unit 510, a distance-measurement control unit 520 and a display unit 530. The clock unit 510 measures time from the moment at which the light-transmitting unit 200 transmits signal light to the moment at which the signal light reflected on a target object is received.

The distance-measurement control unit 520 performs overall control of a distance measurement operation in the distance measuring apparatus 10. A target of control by the distance-measurement control unit 520 includes the light-emitting unit 210 of the light-transmitting unit 200 and the like. The distance-measurement control unit 520 calculates the distance between the distance measuring apparatus 10 and the target object based on the time measured by the clock unit 510. If the distance measuring apparatus 10 has a function of detecting an inclination or the like, it may calculate a horizontal distance to the target object, a difference in height or the like. Furthermore, the clock unit 510 may compensate calculation results in accordance with environmental changes such as temperature.

The display unit 530 has a transmissive liquid crystal display panel or an organic LED display panel placed at the focus position (reticle position) of the object optical system 220 of the light-transmitting unit 200, or a reflective liquid crystal display panel that has a configuration to guide a display image to the reticle position by an unillustrated optical system, and shows, by means of characters, images or the like, to the user a calculation result of the distance-measurement control unit 520 such as the distance to a target object. Other than distance measurement results, the display unit 530 may display a battery remaining amount, error messages, a clock or the like together. The user can obtain distance measurement results or other information while observing a target object through the eyepiece optical system 110 of the sighting unit 100.

Furthermore, the display unit 530 may display a message to call the user's attention about holding of the distance measuring apparatus 10 when the amplitude or frequency of a shake detected by the shake detection unit 340 exceeds a predetermined threshold. Thereby, power of the distance measuring apparatus 10 can be saved by reducing a burden on the compensating unit 300.

Figure 2:
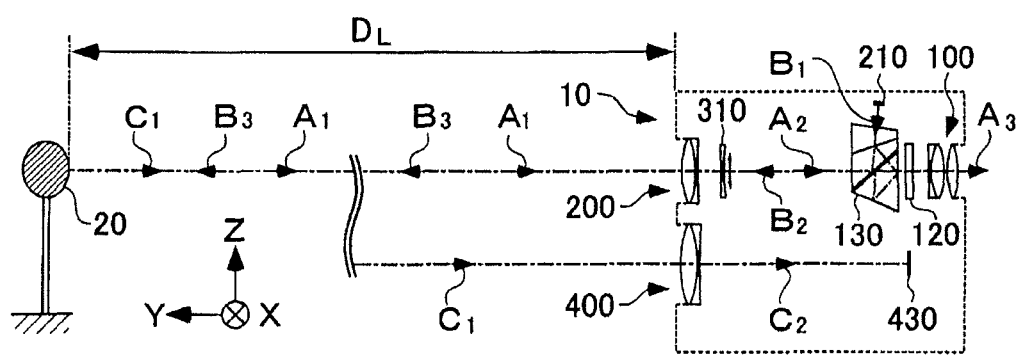
FIG. 2 is a schematic view for optically explaining a distance measurement operation of the distance measuring apparatus 10.

FIG. 2 is a schematic view for optically explaining a distance measurement operation of the distance measuring apparatus 10. FIG. 2 shows a case where a distance to a target object 20 located sufficiently far away from the distance measuring apparatus 10 is measured by the distance measuring apparatus 10 in a horizontal state.

Note that in the following figures, the propagation direction of signal light emitted from the light-transmitting unit 200 toward the target object 20 is described as the Y direction. Also, the direction that is orthogonal to the Y direction on the sheet surface and that is oriented from the bottom to the top on the sheet surface is described as the Z direction, and the direction that is oriented from the near side to the far side on the sheet surface among directions that are orthogonal to the sheet surface is described as the X direction. Also, directions opposite to these X direction, Y direction and Z direction are described as (−X)-direction, (−Y)-direction and (−Z)-direction.

The user that uses the distance measuring apparatus 10 first sights the target object 20. Among light that is reflected or scattered from the target object 20, the beam $A_1$ that is propagated in the (−Y)-direction in the figure within a range of the angle of view of the object optical system enters the distance measuring apparatus 10 through the object optical system 220 and the compensating member 310. The beam $A_1$ that has entered thereto is propagated as the beam $A_2$ in the distance measuring apparatus 10, and is emitted in the (−Y)-direction in the figure from the rear end of the distance measuring apparatus 10 through the erecting prism 130, the reticle plate 120 and the eyepiece optical system 110.

The user that uses the distance measuring apparatus 10 sights the target object 20 by matching an image of the target object 20 observed through the eyepiece optical system 110 with the reticle. Thereby, signal light projected as the beam $B_3$ propagated from the light-transmitting unit 200 forward from the distance measuring apparatus 10 in the Y direction is irradiated on the target object 20

When the signal light is projected onto the target object 20, the signal light reflected on the target object 20 is propagated as a beam $C_1$ in the (−Y)-direction.

In the distance measuring apparatus 10, part of the beam $C_1$ propagated within the angle of view of the light-receiving unit 400 enters into the distance measuring apparatus 10 from the object optical system 410. When the distance from the distance measuring apparatus 10 to the target object 20 is assumed to be several hundred meters, the angle of view of the object optical system 410 may be set to approximately ±0.35° for example.

The band including signal light among the beam $C_2$ propagated in the distance measuring apparatus 10 in the (−Y)-direction is transmitted through the band transmitting filter 420 and enters the light-receiving element 430. The beam $A_2$ forms a spot image at an approximately central portion on a light-receiving surface of the light-receiving element 430 and is detected. Thereby, the distance measuring unit 500 of the distance measuring apparatus 10 displays for the user a distance $D_L$ from the distance measuring apparatus 10 to the target object 20 that has been calculated based on propagation time of the signal light.

Figure 3:
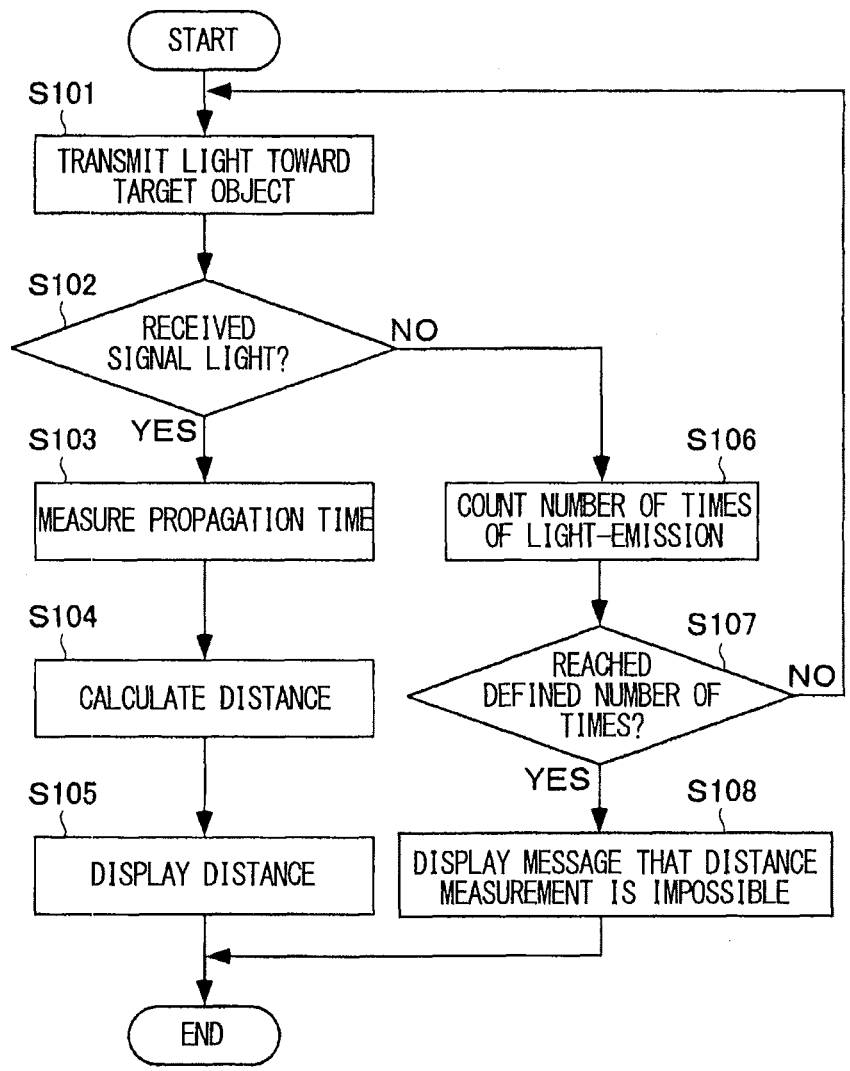
FIG. 3 is a flowchart showing a procedure of the distance measurement operation of the distance measuring apparatus 10.

FIG. 3 is a flowchart showing one example of a procedure of the distance measurement operation in the distance measuring apparatus 10. When distance measurement is started in response to an instruction for distance measurement by manipulation by the user such as turning on a switch, the distance-measurement control unit 520 first instructs the light-emitting unit 210 to emit light (Step S101). Thereby, signal light is projected onto a target object through the light-transmitting unit 200.

Note that the light-transmitting unit 200 may be caused to repeatedly project pulsed signal light with a period that is longer than propagation time until the light-receiving unit 400 receives reflected light. Thereby, reattempt becomes possible immediately even when reflected light from a target object could not be received for some reason.

Next, the distance-measurement control unit 520 judges whether or not the light-receiving unit 400 has received the signal light (Step S102). When the light-receiving unit 400 has received the signal light (Step S102: YES), the clock unit 510 is caused to measure time from the moment when the light-emitting unit 210 emitted the signal light to the moment at which the light-receiving element 430 detected the signal light (Step S103), and subsequently is caused to calculate the propagation distance of the signal light (Step S104).

Furthermore, the distance-measurement control unit 520 causes the display unit 530 to display the distance calculated by the clock unit 510 (Step S105). Note that in some cases, at Step S104, the clock unit 510 detects an inclination of the distance measuring apparatus 10 or the like, and converts a calculation result based on based on measurement into a horizontal distance, a difference in height or the like.

On the other hand, when the light-receiving unit 400 could not receive the signal light at Step S102 (Step S102: NO), the distance-measurement control unit 520 increments the number of times when the light-emitting unit 210 was instructed to emit light (Step S106), and subsequently judges whether or not the number of times has reached a predetermined number of times (Step S107).

Here, when it has been known that the number of trials of distance measurement has reached a defined number of times (Step S107: YES), the distance-measurement control unit 520 stop the distance measurement operation, and causes the display unit 530 to display the fact that measurement is not possible. On the other hand, when it has been known that the number of trials of distance measurement has not reached the defined number of times (Step S107: NO), the distance-measurement control unit 520 repeats the series of distance measurement operations from Step S101 again. In this manner, the distance measuring apparatus 10 can complete the distance measurement operations at high possibility.

Referring again to FIG. 1, the compensating unit 300 has the shake detection unit 340 and a compensation control unit 330 in addition to the compensating member 310 and the driving unit 320.

The shake detection unit 340 includes a plurality of angular velocity sensor or the like whose detection directions cross each other. The plurality of angular velocity sensors are disposed in directions for detecting pitching and yawing of the distance measuring apparatus 10 for example. Each of the angular velocity sensors outputs a signal corresponding to the displacement direction and displacement amount when the distance measuring apparatus 10 is displaced.

The compensation control unit 330 periodically refers to an output of the shake detection unit 340, and calculates the displacement direction and displacement amount of the compensating member 310 to cancel out an image blur that is generated in the sighting unit 100 due to displacement of the distance measuring apparatus 10. Also, the compensation control unit 330 informs the driving unit 320 of the calculated displacement direction and displacement amount, and causes it to drive the compensating member 310.

The driving unit 320 displaces the compensating member 310 in a direction to cross the optical axis based on a command received from the compensation control unit 330. Thereby, an image blur in the sighting unit 100 is suppressed, and it is possible to prevent signal light from deviating from a target object.

Furthermore, the compensation control unit 330 acquires the displacement amount from the compensating member 310, and performs feedback control of the drive amount of the compensating member 310. Thereby, even when disturbance such as a shock or a vibration occurs, the position of the compensating member 310 can be controlled accurately.

Note that although the compensating unit 300 may perform the compensating operation all the time, but it may execute the compensating operation only during a period in which the user is using the distance measuring apparatus 10. That the user is using the distance measuring apparatus 10 may be detected for example by detecting an eye of the user that is looking into the eyepiece optical system 110, and the compensating unit 300 may be turned on/off. Also, the user may manipulate a switch or the like to start the operation by the compensating unit 300. Furthermore, the compensating unit 300 may be caused to terminate the operation when there is not manipulation by the user for a time period that is longer than predetermined time.

Figure 4:
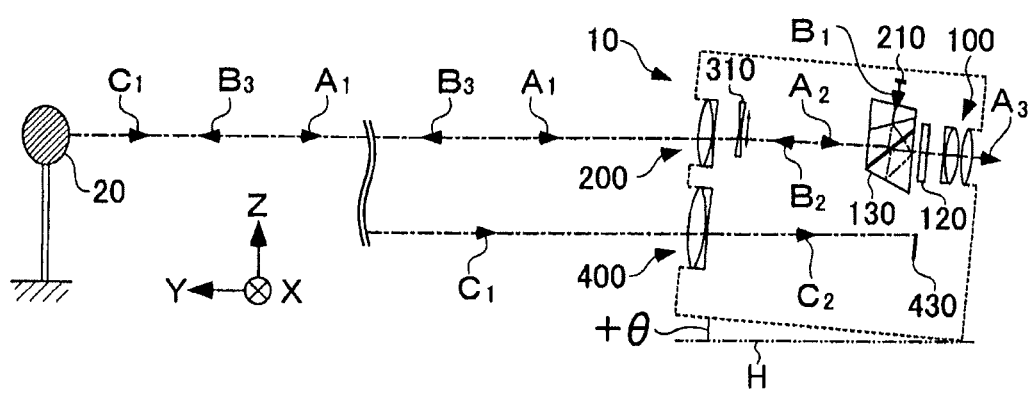
FIG. 4 is a schematic view for explaining a compensating operation of a compensating unit 300.

FIG. 4 is a schematic view for optically explaining a compensating operation of the compensating unit 300 in the distance measuring apparatus 10. The distance measuring apparatus 10 has rotated clockwise in the figure from the state shown in FIG. 2, and is inclined relative to the horizontal plane H by an angle (+$\theta_0$). Thereby, the front end of the distance measuring apparatus 10 is displaced in the Z direction, and the optical axis of the object optical system 220 points above the target object 20 in the figure.

In the compensating unit 300, the shake detection unit 340 detects rotation of the distance measuring apparatus 10, and displaces the compensating member 310 in the Z direction by means of the driving unit 320. Thereby, the beam $A_1$ propagated from the target object 20 toward the distance measuring apparatus 10 horizontally in the (−Y)-direction is propagated inside the distance measuring apparatus 10 as the beam $A_2$ inclined by the same degree as the inclination of the distance measuring apparatus 10. Therefore, an image of the target object 20 formed in the eyepiece optical system 110 is not displaced.

Also, the optical path of the beam $B_2$ of signal light tilted together with the distance measuring apparatus 10 inside the distance measuring apparatus 10 is compensated to be horizontal by the compensating member 310. Thereby, the beam $B_3$ of signal light that is emitted from the distance measuring apparatus 10 and propagated in the Y direction is still projected onto the target object 20.

The signal light projected onto the target object 20 is reflected by the target object 20. Among the reflected signal light, the beam $C_1$ included in the angle of view of the light-receiving unit 400 enters the distance measuring apparatus 10 from the light-receiving unit 400, and is propagated as the beam $C_2$ in the (−Y)-direction. The beam $C_2$ is eventually detected by the light-receiving element 430, and the distance measuring unit 500 displays for the user the distance $D_L$ calculated based on the propagation time of the signal light.

Figure 5:
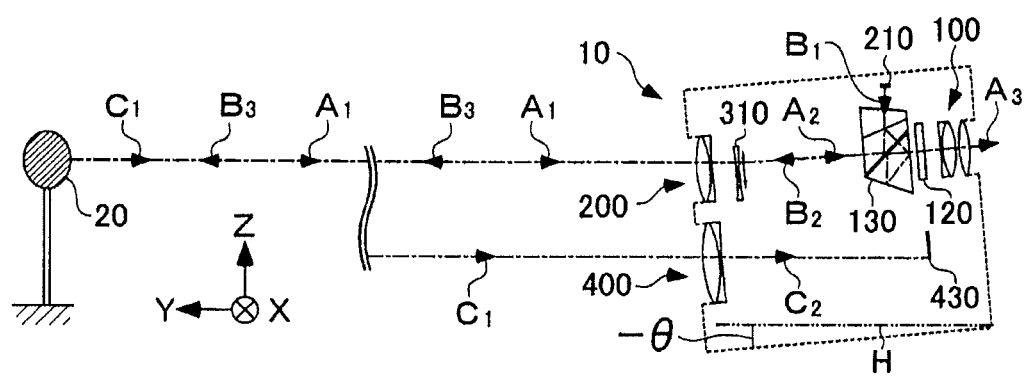
FIG. 5 is a schematic view for explaining the compensating operation of the compensating unit 300.

FIG. 5 is a schematic view for explaining another compensating operation of the compensating unit 300 in the distance measuring apparatus 10. The distance measuring apparatus 10 has rotated counterclockwise in the figure from the state shown in FIG. 2, and is inclined relative to the horizontal plane H by an angle (−$\theta_0$). Thereby, the front end of the distance measuring apparatus 10 is displaced in the (−Z)-direction, and the optical axis of the object optical system 220 points below the target object 20 in the figure.

In the compensating unit 300, the shake detection unit 340 detects rotation of the distance measuring apparatus 10, and displaces the compensating member 310 in the (−Z)-direction by means of the driving unit 320. Thereby, the beam $A_1$ propagated from the target object 20 toward the distance measuring apparatus 10 horizontally in the (−Y)-direction is propagated inside the distance measuring apparatus 10 as the beam $A_2$ inclined by the same degree as the inclination of the distance measuring apparatus 10. Therefore, an image of the target object 20 formed in the eyepiece optical system 110 is not displaced.

Also, the optical path of the beam $B_2$ of signal light tilted together with the distance measuring apparatus 10 inside the distance measuring apparatus 10 is compensated to be horizontal by the compensating member 310. Thereby, the beam $B_3$ of signal light that is emitted from the distance measuring apparatus 10 and propagated in the Y direction is still projected onto the target object 20.

The signal light projected onto the target object 20 is reflected by the target object 20. Among the reflected signal light, the beam $C_1$ included in the angle of view of the light-receiving unit 400 enters the distance measuring apparatus 10 from the light-receiving unit 400, and is propagated as the beam $C_2$ in the (−Y)-direction. The beam $C_2$ is eventually detected by the light-receiving element 430, and the distance measuring unit 500 displays for the user the distance $D_L$ calculated based on the propagation time of the signal light.

In this manner, in the distance measuring apparatus 10, even when the distance measuring apparatus 10 is displaced upward or downward relative to the horizontal plane H, the optical path of the beam $A_2$ propagated inside the distance measuring apparatus 10 is compensated by the compensating unit 300, and an image of the target object 20 observed by the user through the sighting unit 100 is not displaced. Also, the optical path of the beam $B_3$ of signal light projected by the light-transmitting unit 200 onto the target object 20 is compensated to be horizontal, and the beam $B_3$ remains projected onto the target object 20. Therefore, even when displacement due to a shake of the user occurs, distance measurement can be executed by sighting the target object 20 easily.

Note that although in the above-described example, the case where the distance measuring apparatus 13 shakes in the Z direction was explained, the compensating unit 300 can of course compensate an image blur similarly when the distance measuring apparatus 13 shakes in the (−Z)-direction. Also, because the driving unit 320 displaces the compensating member 310 in the X/−X direction perpendicular to the sheet surface, the compensating unit 300 can compensate a shake of the distance measuring apparatus 13 in the X/−X direction.

Figure 6:
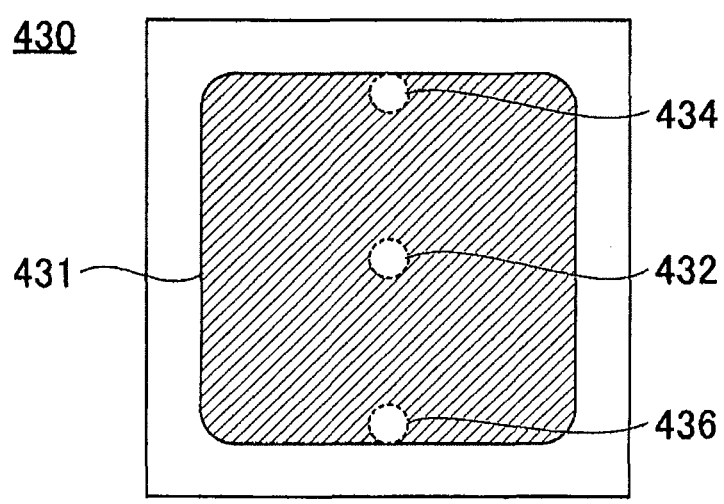
FIG. 6 is a figure showing a spot image formed in a light-receiving element 430.

FIG. 6 is a figure schematically showing a spot image of signal light formed in the light-receiving element 430. As explained by referring to FIG. 2, when the distance measuring apparatus 10 is in a horizontal state, the spot image 432 formed, by the signal light reflected by the target object 20, in a light-receiving region 431 of the light-receiving element 430 is located at an approximately central portion of the light-receiving region 431.

Here, when the distance measuring apparatus 10 is displaced upward as shown in FIG. 4, the optical path of the beam $B_3$ of signal light projected onto the target object 20 is still kept horizontal. Therefore, the beam $C_2$ entering the light-receiving element 430 is also propagated substantially horizontally in the distance measuring apparatus 10 by reflecting the horizontal optical path of the beam $B_3$.

However, the light-receiving element 430 that receives the beam $C_2$ is displaced downward along with an inclination of the distance measuring apparatus 10. For this reason, the beam $C_2$ forms a spot image 434 at a position that is decentered toward the upper end side in the light-receiving region 431 of the light-receiving element 430.

Also, when the distance measuring apparatus 10 is displaced downward as shown in FIG. 5, the beam $C_2$ entering the light-receiving element 430 is propagated substantially horizontally in the distance measuring apparatus 10. However, the light-receiving element 430 that receives the beam $C_2$ is displaced upward along with an inclination of the distance measuring apparatus 10. For this reason, the beam $C_2$ forms a spot image 436 at a position that is decentered toward the lower end side in the light-receiving region 431 of the light-receiving element 430.

In this manner, when the compensating unit 300 performs the compensating operation, the position at which signal light forms a spot image in the light-receiving element 430 changes. In the distance measuring apparatus 10, a range of compensation by the compensating unit 300 is limited to a range within which the light-receiving element 430 can detect signal light. Thereby, also when the compensating unit 300 performs an operation, the distance measuring apparatus 10 remains capable of executing the distance measurement operation.

Figure 7:
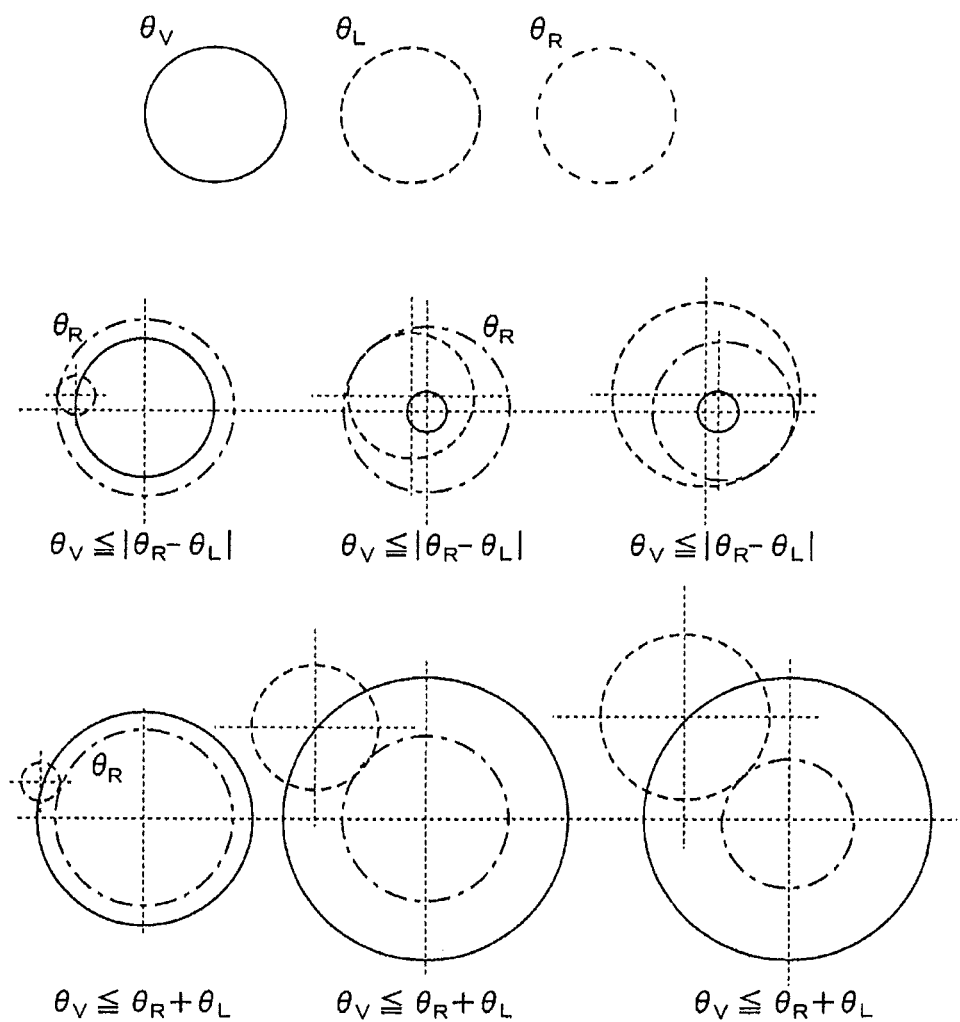
FIG. 7 is a schematic view for explaining a displacement condition for signal light.

FIG. 7 is a schematic view for explaining a condition about a range within which signal light used for distance measurement is displaced. Note that FIG. 7 shows a relative relationship between a light-receiving range, an irradiation range or the like, but does not show sizes of the light-receiving range and the irradiation range. In the figure, a relationship among $\theta v$, $\theta R$ and $\theta L$ is shown. $\theta v$ is a shake-preventing angle indicating a range within which signal light is displaced due to a compensating operation, $\theta R$ is a light-receiving angle indicating a light-receiving range of the light-receiving element 430 and $\theta L$ is an irradiation range of the signal light.

As shown at a middle portion of the figure, a condition for a case where the light-receiving element 430 can receive entire signal light is as shown in Equation 1 shown below.

$$\theta v + \theta L \leq \theta R$$

$$\theta v \leq |\theta R - \theta L| \quad \text{(Equation 1)}$$

Also, as shown at a lower portion of the figure, a condition for a case where the light-receiving element 430 can receive at least part of signal light is as shown in Equation 2 shown below.

$$\theta v - \theta L \leq \theta R$$

$$\theta v < \theta R + \theta L \quad \text{(Equation 2)}$$

Therefore, in the distance measuring apparatus 10, the compensating unit 300 executes the compensating operation so that the optical path of signal light is displaced in a range that satisfies at least Equation 2. Also, when the compensating unit 300 displaces the optical path of the signal light in a range that satisfies Equation 1, the distance measurement operation is executed surely because high signal intensity is detected from the light-receiving element 430.

Furthermore, the optical path of signal light may be displaced in a range that is intermediate between the condition of Equation 2 and the condition of Equation 1, for example, in a range in which the light-receiving element 430 detects a half of the entire signal light intensity. In this manner, the range in which the compensating unit 300 displaces signal light may be decided based on the signal intensity of signal light detected by the light-receiving element 430.

Note that, in order to make full use of the compensation range of the compensating member 310, as shown in FIG. 7, in any of the above-mentioned configurations, preferably a shake-preventing operation is performed such that the center of the shake-preventing angle $\theta v$ that indicates a range within which the signal light is displaced due to the compensating operation matches the center of the light-receiving angle $\theta R$ that indicates the light-receiving range of the light-receiving element 430.

The compensation range can be limited for example by regulating the displacement amount of the compensating member 310. The displacement amount of the compensating member 310 may regulate a range of commands for the driving unit 320 generated by the compensation control unit 330. Also, a mechanical or electrical limitation may be provided to the driving unit 320 or the compensating member 310.

Note that in the compensating unit 300, the compensation control unit 330 may execute a process to add a limitation to a detection result detected by the shake detection unit 340. For example, when high detection accuracy is required according to use of the distance measuring apparatus 10, the degree of a shake to be detected by the shake detection unit 340 is limited, and resources of the shake detection unit 340 may be allocated for resolution of detection. In this case, the shake detection unit 340 does not detect a shake amount that exceeds a predetermined range.

Alternatively, for a purpose of detecting a larger shake, the compensation control unit 330 may lower resolution of the shake detection unit 340 for detecting a shake. Furthermore, the compensation control unit 330 may raise resolution of the shake detection unit 340 within a range where a detected shake amount is small, and may impose a limitation such that resolution of the shake detection unit 340 is lowered as a detected shake amount becomes larger.

As described above, when the compensating unit 300 executes the compensating operation, the spot image of signal light is displaced in the light-receiving region 431 of the light-receiving element 430. Therefore, in the distance measuring apparatus 10 provided with the compensating unit 300, a margin for tolerating displacement in a case where the compensating operation is performed is preferably left around a spot image formed when the compensating operation is not performed. From such a viewpoint, also when a calibrating unit 600 calibrates the distance measurement range, the calibration is preferably performed by anticipating a margin for the compensating operation.

Also, at least at a stage of factory shipment, preferably the distance measuring apparatus 10 is adjusted such that the spot image of signal light is located at the center of the light-receiving region 431 of the light-receiving element 430 when the compensating member 310 is located at the center of the moving range relative to a reflection surface orthogonal to the optical axis of the signal light as a sighting target. Thereby, the compensation range of the compensating unit 300 can be expanded isotropically.

Furthermore, the distance measuring apparatus 10 may be provided with an alerting unit that alerts the user that it is in a situation where compensation cannot be performed, or that it is possible that signal light is deviating from the target object 20 of distance measurement when the distance measuring apparatus 10 far exceeds the range within which the compensating unit 300 can perform compensation. Also, in such a case, the compensation control unit 330 may terminate driving of the compensating member 310 by the driving unit 320, and may suspend the compensating operation until a shake detected by the shake detection unit 340 subsides.

Note that when the shake detection unit 340 has detected that a shake that exceeds a limit of compensation has subsided, compensation of the shake may be resumed again. Also, when the driving unit 320 is not driving the compensating member 310, displacement of the compensating member 310 may be locked electrically or mechanically. Also, when the compensating member 310 is locked, the position of the compensating member 310 may be forced to return to the center of its moving range.

Also, the compensation control unit 330 may start the compensating operation by using the position of the compensating member 310 in a case where the spot image 434 of signal light is formed at the center of the light-receiving region 431 as the initial position of the compensating member 310. The initial position of the compensating member 310 may be adjusted at a stage of shipping the distance measuring apparatus 10 or may be adjusted immediately before starting distance measurement. Thereby, the compensating unit 300 can execute the compensating operation in a wide compensation range by making use of the entire surface of the light-receiving region 431.

Furthermore, in the above-described example, the case where the distance measuring apparatus 10 shakes in the Z/−Z direction was explained. However, the driving unit 320 is provided with an actuator that displaces the compensating member 310 in the X/−X direction that is perpendicular to the sheet surface. Thereby, the compensating unit 300 can compensate a shake of the distance measuring apparatus 10 in the X/−X direction.

Still furthermore, displacement of the distance measuring apparatus 10 in any direction can be compensated by combining compensation in the Z/−Z direction and compensation in the X/−X direction. Still furthermore, by providing another driving unit that swings the compensating member 310, the compensating unit 300 may execute compensation by swinging the compensating member 310.

The shape of the light-receiving region 431 of the light-receiving element 430 is of course not limited to a rectangle. Rather, taking into consideration that the compensation range of the compensating unit 300 is defined by the shape of the light-receiving region 431, the shape of the light-receiving region 431 may be a circle in which intervals from the center to edge portions are uniform. Thereby, the compensation range of the compensating unit 300 can be made equal in all the directions. Also, an optical member having a positive refractive index may be provided in front of the light-receiving element 430 to condense the beam $C_2$ of the signal light onto the light-receiving element 430.

Figure 8:
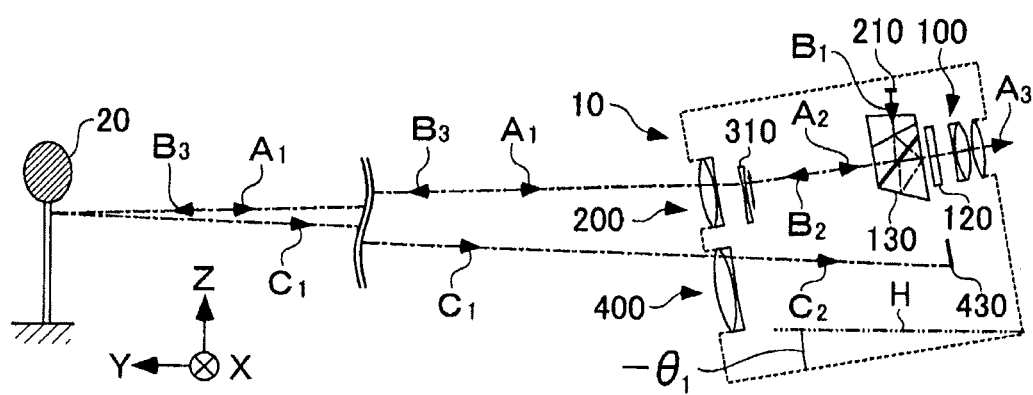
FIG. 8 is a schematic view for explaining the compensating operation of the compensating unit 300.

FIG. 8 is a schematic view for explaining another compensating operation of the compensating unit 300 in the distance measuring apparatus 10. The distance measuring apparatus 10 has rotated counterclockwise in the figure further from the state shown in FIG. 6, and is inclined relative to the horizontal plane H by a larger angle $(-\theta_1)$. Thereby, the front end of the distance measuring apparatus 10 is displaced in the (−Z)-direction, and the optical axis of the object optical system 220 points below the target object 20 in the figure.

In the compensating unit 300, the shake detection unit 340 detects rotation of the distance measuring apparatus 10, and displaces the compensating member 310 in the (−Z)-direction by means of the driving unit 320. Thereby, the beam $A_1$ that is propagated from the target object 20 toward the distance measuring apparatus 10 horizontally in the (−Y)-direction is inclined toward the same side as the inclination of the distance measuring apparatus 10. However, if the inclination of the distance measuring apparatus 10 becomes larger, the position of a spot image formed by signal light in the light-receiving element 430 reaches an end of the light-receiving region 431.

The compensating unit 300 in the distance measuring apparatus 10 executes the compensating operation in a range within which the light-receiving element 430 receives signal light. Therefore, at a stage where the spot image of the signal light reaches an end portion of the light-receiving region 431, displacement of the compensating member 310 is terminated. Therefore, an image of the target object 20 formed in the eyepiece optical system 110 is displaced upward. Also, along with this, the projection position of the signal light projected as the beam $B_3$ is displaced downward relative to the target object 20.

Thereby, the light-receiving element 430 keeps receiving signal light reflected from different positions of the target object 20 or from different objects 20 and remains capable of measuring their distances. In this manner, because it is provided with the compensating unit 300, the distance measuring apparatus 10 remains retaining a function of measuring distances even when significant displacement has occurred.

Note that the distance-measurement control unit 520 may notify, externally through the display unit 530, that the compensation amount calculated by the clock unit 510 has exceeded the moving range of the compensating member 310 when such an event has occurred. Thereby, the user is prompted to hold the distance measuring apparatus 10 stably, and a burden on the compensating unit 300 can be reduced.

Figure 9:
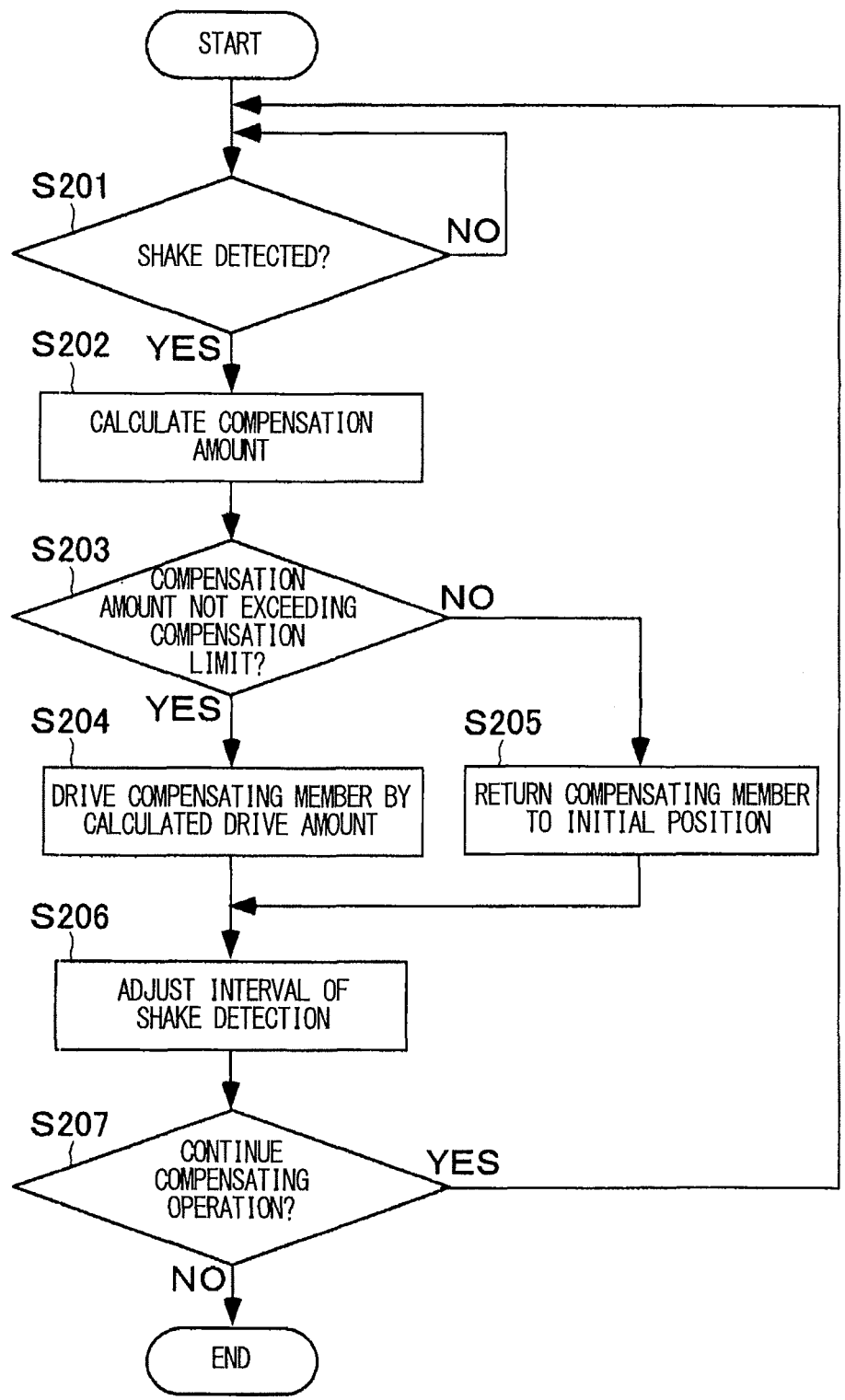
FIG. 9 is a flowchart for explaining an operation of the compensating unit 300.

FIG. 9 is a flowchart showing a control procedure of the compensation control unit 330 that controls an operation of the compensating unit 300 as described above. When the compensating unit 300 starts the compensating operation, the compensation control unit 330 judges whether the shake detection unit 340 has detected a shake of the distance measuring apparatus 10 (Step S201).

When the compensating unit 300 starts the operation, the compensation control unit 330 monitor whether the shake detection unit 340 has detected a shake (Step S201) and stands by (Step S201: NO). When a shake of the distance measuring apparatus 10 is detected by the shake detection unit 340 (Step S201: YES), the compensation control unit 330 calculates the drive amount, that is, the compensation amount, of the compensating member 310 that can cancel out the detected shake (Step S202).

Next, the compensation control unit 330 judges whether the compensating member 310 will not be displaced to exceed the compensation limit when the compensating member 310 is displaced based on the calculated compensation amount (Step S203). The compensation limit means a limit beyond which the spot images 432, 434, 436 formed by signal light in the light-receiving unit 400 starts deviating from the light-receiving region of the light-receiving element 430 when the spot images 432, 434, 436 are moved due to movement of the compensating member 310.

Therefore, as explained already by referring to FIG. 7, the compensation limit is decided so as to satisfy the condition shown in Equation 1 for example, when a shake-preventing angle indicating a range within which signal light is displaced is θv, a light-receiving angle indicating a light-receiving range of the light-receiving element 430 is θR and an irradiation range of the signal light is θL. Also, as explained already by referring to FIG. 7 similarly, the compensation limit may be defined not as a limit beyond which the spot images 432, 434, 436 come out of the light-receiving region of the light-receiving element 430 completely, but at a position at which part of the spot images remains in the light-receiving region as shown in Equation 2. Thereby, at a stage where the compensating member 310 reaches the compensation limit, the light-receiving element 430 still remains receiving signal light, and capable of measuring distances.

Also, the compensation limit to which the compensation control unit 330 refers may be a predetermined value retained in the compensation control unit 330. Also, a value of the compensation limit may be stored in a storage unit that the compensation control unit 330 can refer to.

When it has been known that the compensating member 310 remains in the compensation limit even if it is moved by the calculated compensation amount at Step S203 (Step S203: YES), the compensation control unit 330 sends a command for displacing the compensating member 310 according to the calculated compensation amount to the driving unit 320 (Step S204). Thereby, a shake detected by the shake detection unit 340 is compensated by the compensating member 310, and an image blur of an image of the target object 20 observed through the eyepiece optical system 110 is prevented.

Also, signal light emitted from the light-transmitting unit 200 does not deviate from the originally sighted object 20. Furthermore, because the signal light reflected on the target object 20 remains being received by the light-receiving element 430, the distance measuring unit 500 remains capable of measuring a distance from the distance measuring apparatus 10 to the target object 20.

On the other hand, when the calculated compensation amount causes the compensating member 310 to move beyond the compensation limit at Step S203 (Step S203: NO), the compensation control unit 330 stops the shake compensation by the compensating member 310 and restores the initial position of the compensating member 310 (Step S205). Thereby, in some cases, an image blur of the target object 20 may occur in the sighting unit 100, and signal light may be projected onto an object other than the target object 20. However, the distance measuring apparatus 10 remains capable of executing distance measurement.

Next, the compensation control unit 330 adjusts a time interval for a case where the shake detection unit 340 detects a shake of the distance measuring apparatus 10 periodically. (Step S206). In other words, when the compensating unit 300 can compensate a shake of the distance measuring apparatus 10 by a series of the compensating operations from Step S201 to Step S204, the number of times of the compensating operations from Step S202 to Step S204 may be reduced for example by making the shake detection interval longer. Thereby, power consumption by the compensating unit 300 can be suppressed.

Also, when a continuous compensating operation of the compensating unit 300 is suspended due to the operations from Step S201 to Step S205, the number of times of the compensating operations from Step S202 to Step S203 per unit time may be increased for example by making a shake detection interval shorter. Thereby, the possibility of being able to complete effective compensating operations before the compensation amount reaches the compensation limit can be made higher. Note that adjustment of an interval in Step S206 of course includes not changing a compensation interval.

Next, the compensation control unit 330 judges whether or not an instruction to cause the compensating unit 300 to execute the compensating operation is still effective (Step S207). The instruction for the compensating operation is still effective as a result of the judgment (Step S207: YES), the compensation control unit 330 returns again to Step S201 and monitors whether the shake detection unit 340 has detected a shake. When it has been known that the instruction for the compensating operation has become ineffective at Step S207 (Step S207: NO), the compensation control unit 330 ends the operation of the compensating unit 300.

Note that in the above-mentioned example, the compensating unit 300 at Step S203 determines the compensation limit by referring to a value that is prepared in advance. However, for example, an imaging sensor may be used as the light-receiving element 430, and the operation of the driving unit 320 may be limited when the position of the spot image of signal light approaches an edge of the light-receiving region 431. Thereby, the compensation limit can be detected automatically without lowering the incoming light intensity of signal light received by the light-receiving element 430.

Figure 10:
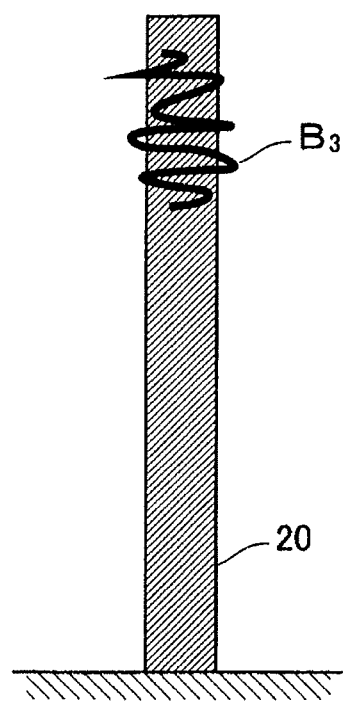
FIG. 10 is a figure showing one example of a control method of the compensating unit 300.

FIG. 10 is a figure showing one example of a control method of the compensating unit 300, and is a schematic view showing a track of a spot of the signal light $B_3$ irradiated onto the target object 20 while being displaced by the compensating unit 300. By controlling the compensating member 310 as illustrated in the direction in which the incoming light intensity detected in the light-receiving element 430 becomes higher, the range onto which the signal light $B_3$ is irradiated can be concentrated onto a region where the target object 20 is present. Therefore, the distance measurement operation can be executed surely and efficiently.

Figure 11:
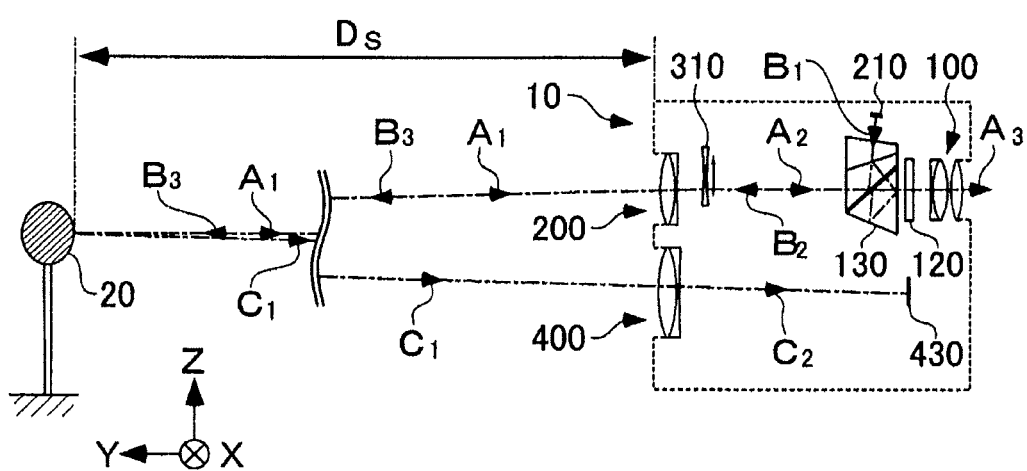
FIG. 11 is a schematic view for explaining another compensating operation of the compensating unit 300.

FIG. 11 is a schematic view for explaining another compensating operation of the compensating unit 300. In FIG. 11, the distance measuring apparatus 10 is in a horizontal state similar to the state shown in FIG. 2. Note that the distance measuring apparatus 10 is close to the target object 20 so that the distance therebetween is a short distance $D_S$, an unnegligible parallax is generated between the light-transmitting unit 200 and the light-receiving unit 400 of the distance measuring apparatus 10. For this reason, the angle of incidence of the beam $C_1$ relative to the light-receiving unit 400 becomes large, and the incident position of the beam $C_2$ relative to the light-receiving element 430 is displaced.

On the other hand, as described above, the compensating unit 300 can displace the compensating member 310 within a range not exceeding the compensation limit. Accordingly, by displacing the compensating member 310, the orientation of the optical path of the beam $B_3$ of the signal light projected toward the target object 20 in the Y direction can be changed, and lowering of the incoming light intensity of signal light due to the parallax between the light-transmitting unit 200 and the light-receiving unit 400 can be compensated.

In other words, when the distance $D_S$ from the distance measuring apparatus 10 to the target object 20 is short, the user instructs to switch the distance measurement range for example by switch manipulation or the like to displace the optical path of the beam $B_3$ in the (−Z) direction. Thereby, the parallax between the light-transmitting unit 200 and the light-receiving unit 400 can be mitigated to improve the light reception efficiency of the signal light in the light-receiving element 430.

In this manner, when the compensating member 310 is displaced according to the distance, the displacement amount of the compensating member 310 becomes larger as the measurement target approaches the distance measuring apparatus 10. Therefore, when the target object 20 approaches the distance measuring apparatus 10 to exceed a predetermined threshold, the compensation control unit 330 may increase the displacement amount of the compensating member 310.

Also, because signal light is surely received by the light-receiving element 430 by changing the optical path of the beam $B_3$ of the signal light by means of the compensating unit 300, the area of the light-receiving region 431 of the light-receiving element 430 can be made smaller. Thereby, the SN ratio of the signal light can be made higher, and the component cost of the light-receiving element 430 can be reduced.

Note that before starting compensation according to a distance to the target object 20, preferably the compensating member 310 is moved to a position with which the spot image 434 of the signal light is formed at the center of the light-receiving region 431. Thereby, the compensating operation can be executed in a wide compensation range by making use of the entire surface of the light-receiving region 431 of the light-receiving element 430.

Figure 12:
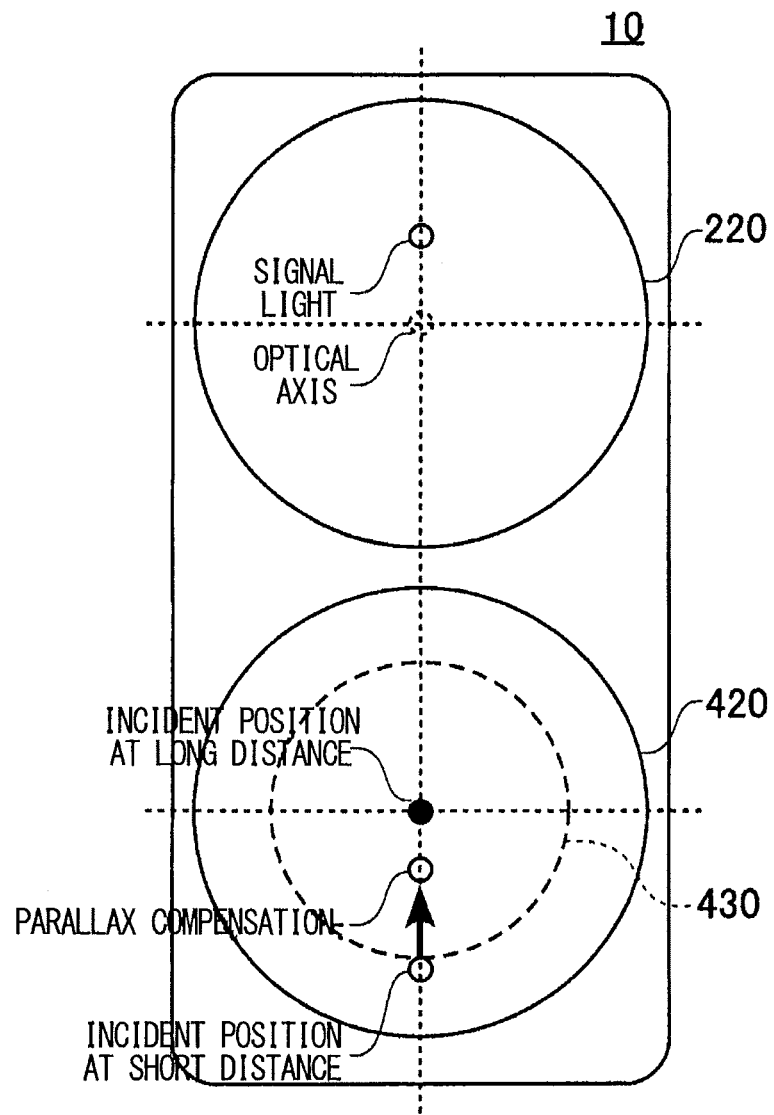
FIG. 12 is a schematic view for explaining parallax compensation in the distance measuring apparatus 10.

FIG. 12 is a schematic view for explaining parallax compensation in the distance measuring apparatus 10. When the distance measuring apparatus 10 is seen from the target object 20 side, the object optical system 220 of the light-transmitting unit 200 and the object optical system 410 of the light-receiving unit 400 are aligned perpendicularly in the figure in front of the distance measuring apparatus 10.

Figure 13:
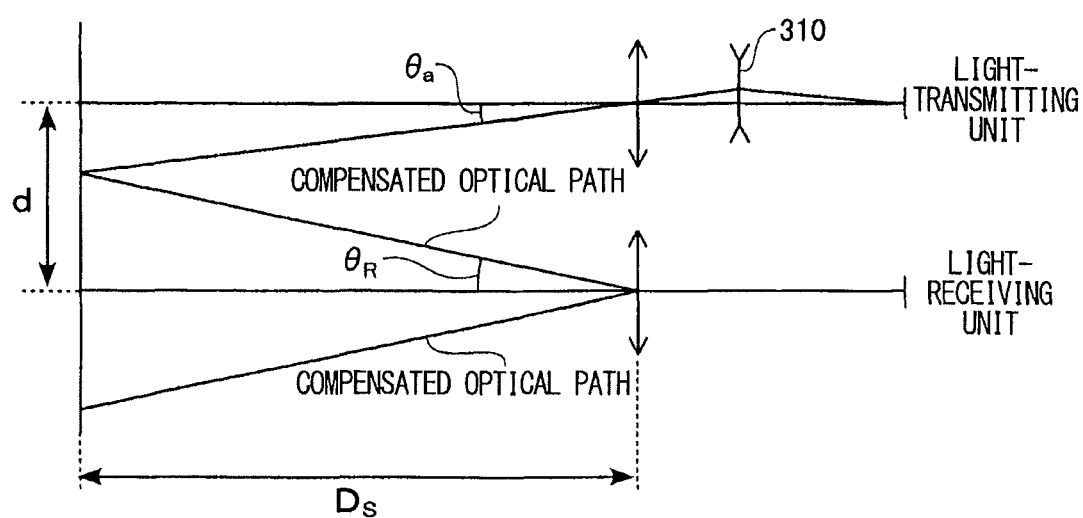
FIG. 13 is a schematic view for explaining parallax compensation in a case where a compensating unit is disposed in a light-transmitting unit 200.

FIG. 13 is a schematic view for explaining a parallax compensation effect when the compensating unit 300 is placed in the light-transmitting unit 200 (corresponding to the configurations of FIGS. 1, 2, 4, 5, 8 and 11). Here, signal light is a parallel beam, and does not spread out. In the figure, "d" denotes the inter-axis distance between the optical axis of the optical system of the light-transmitting unit 200 and the optical axis of the optical system of the light-receiving unit 400. Also, "Ds" denotes an interval between the distance measuring apparatus 10 and the target object 20.

As illustrated, the optical path of the signal light in the light-transmitting unit 200 and the optical path of the signal light in the light-receiving unit 400 are parallel with each other in a state where the compensating member 310 is not displaced. On the other hand, when the compensating member 310 is displaced due to an operation of the compensating unit 300, the optical path of the signal light is displaced in the light-transmitting unit 200, and the optical path of the signal light is inclined to the compensation angle $\theta a$.

When the optical path of the signal light has inclined on the light-transmitting unit 200 side, the light-receiving unit 400 is no longer capable of receiving the signal light at a time point when Equation 3 shown below is no longer satisfied, assuming that the light-receiving angle in the light-receiving unit 400 is $\theta R$.

$$Ds < d/(\tan \theta R + \tan \theta a) \quad \text{(Equation 3)}$$

Therefore, when in the distance measuring apparatus 10, the signal light is inclined to the compensation angle $\theta a$ for parallax compensation, the shortest distance Ds at which the light-receiving unit 400 can receive the signal light can be expressed as in Equation 4 shown below.

$$Ds = d/(\tan \theta R + \tan \theta a) \quad \text{(Equation 4)}$$

Because the spread of the signal light is smaller relative to the lens diameter of the optical system of the light-transmitting unit 200 at a short distance, the spread angle $\theta L$ of the signal light is ignored. However, when the spread angle $\theta L$ of the signal light is taken into consideration, Equation 5 shown above can be modified into Equation 6 shown below.

$$\tan \theta R \rightarrow \tan \theta R + \tan \theta L \quad \text{(Equation 5)}$$

In this case, Equation 4 shown above can be expressed as Equation 6 shown below.

$$Ds = d/(\tan \theta R + \tan \theta L + \tan \theta a) \quad \text{(Equation 6)}$$

Note that it is assumed that in Equations 5 and 6 shown above, Equation 7 shown below is established by considering the compensation angle $\theta a$ as a minute angle.

$$\tan(\alpha + \beta) = \tan \alpha + \tan \beta \quad \text{(Equation 7)}$$

Now, when the inter-axis distance d between the optical axis of the light-transmitting unit 200 and the optical axis of the light-receiving unit 400 is 35 mm, and the spread angle $\theta L$ of the light source light is 0.05°, and the light-receiving angle $\theta R$ of the light-receiving element is 0.5°, in order to measure the distance of 2 m from the distance measuring apparatus to a target, the inclination $\theta a$ of the optical path due to the compensating member 330 is approximately 0.46°. Accordingly, a parallax can be compensated by shifting the compensating member 310 so that the inclination $\theta a$ is 0.46°. Note that when parallax compensation and shake compensation are performed simultaneously, the position of a lens to incline the optical path by $\theta a$ is used as the reference position, and the drive range of the lens may be limited such that the symmetry is realized about the reference position.

Figure 14:
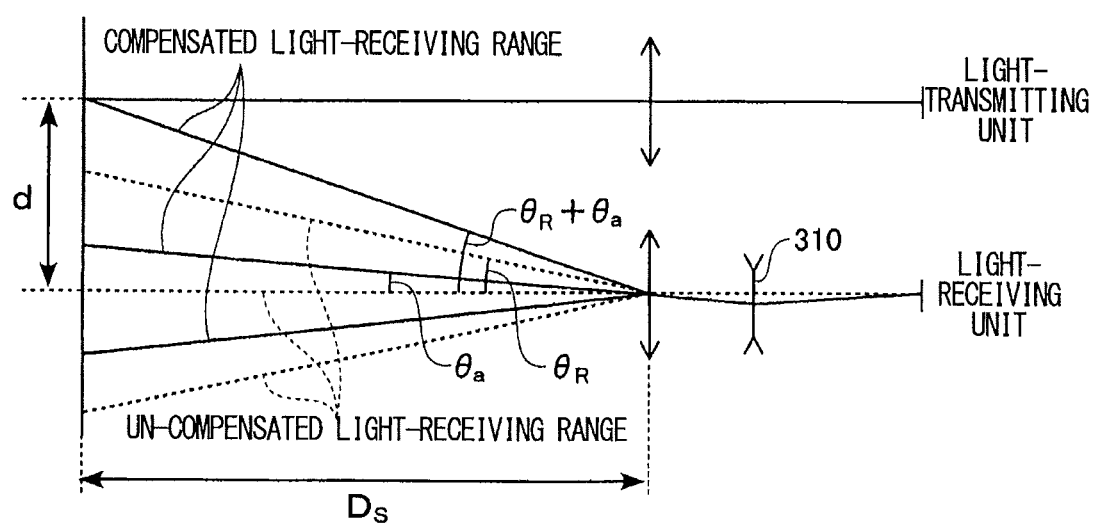
FIG. 14 is a schematic view for explaining parallax compensation in the distance measuring apparatus 10.
Figure 18:
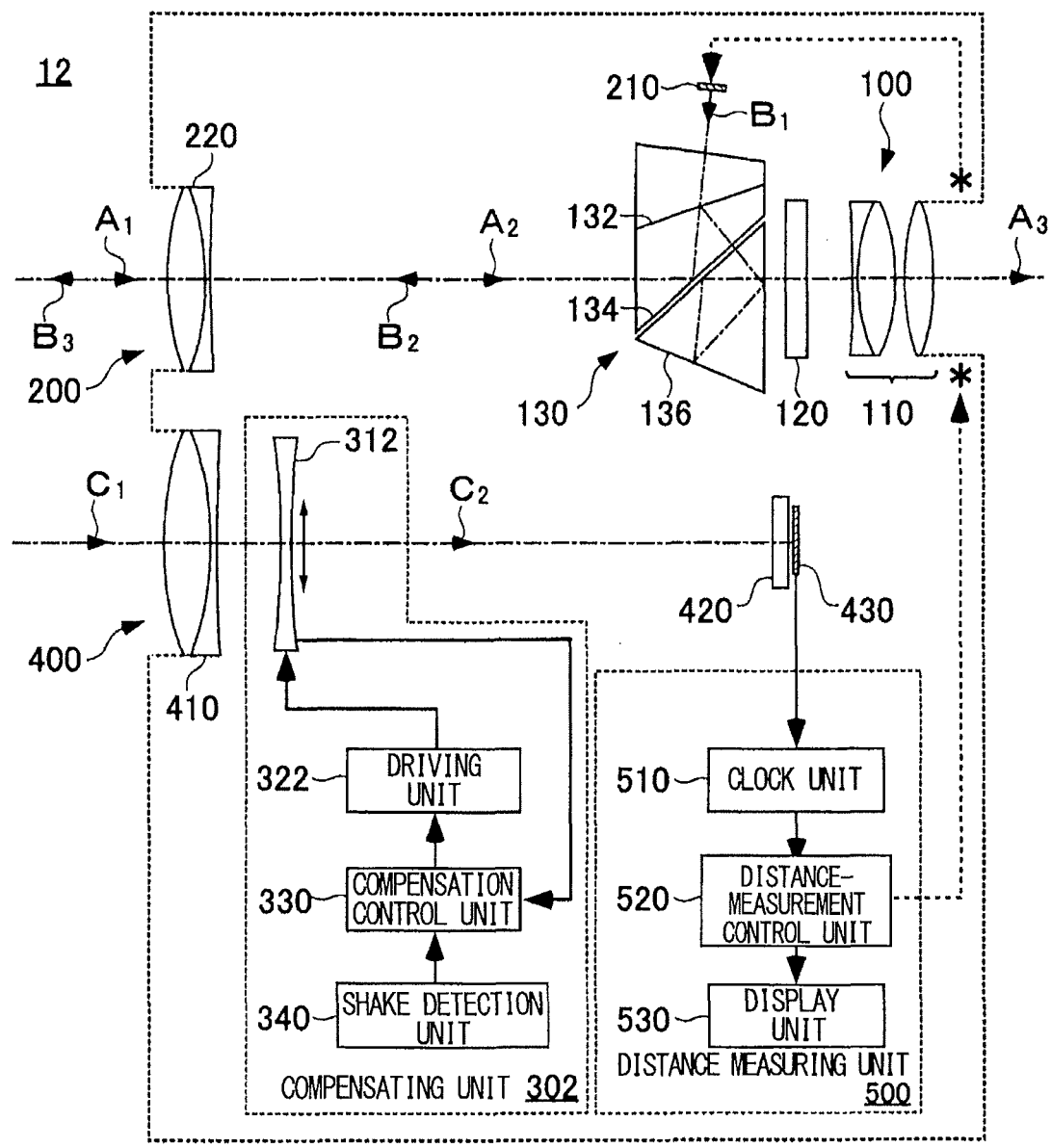
FIG. 18 is a schematic cross-sectional view of a distance measuring apparatus 12.
Figure 19:
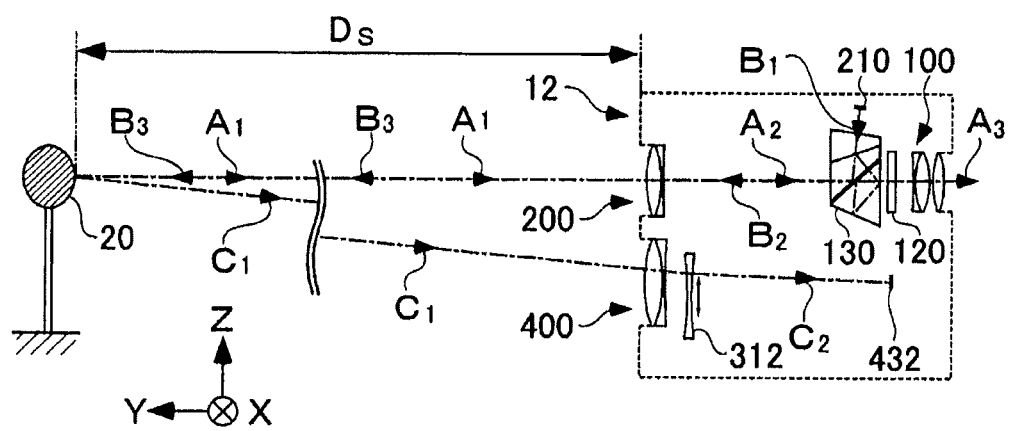
FIG. 19 is a schematic view for explaining a compensating operation of a compensating unit 302.

FIG. 14 is a schematic view for explaining a parallax compensation effect when the compensating unit 300 is placed in the light-receiving unit 400 (corresponding to the configurations of FIGS. 18 and 19). As illustrated, also when the compensating unit 300 is placed in the light-receiving unit, Equation 7 is established as in the case shown in FIG. 15 shown above, except that the direction in which the compensating member 310 moves when the parallax compensation is performed is reversed.

Figure 15:
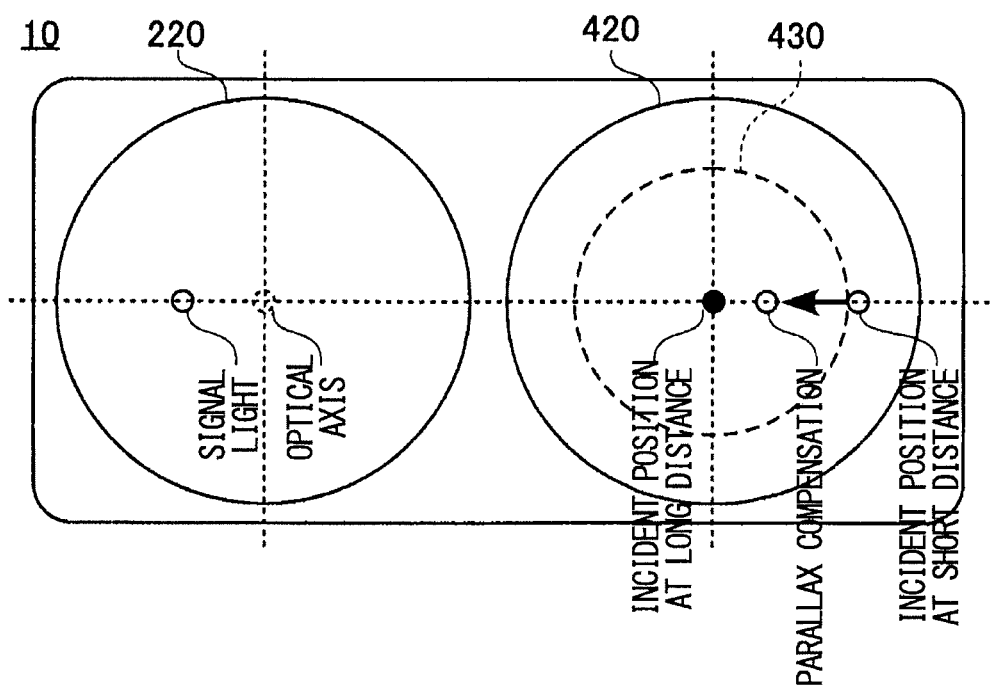
FIG. 15 is a schematic view for explaining parallax compensation in a case where a compensating unit is disposed in the light-receiving unit 400.

FIG. 15 is a schematic view for explaining parallax compensation in the distance measuring apparatus 10, and shows a case where the light-transmitting unit 200 and the light-receiving unit 400 are aligned horizontally Also in the illustrated case, Equation 7 is established similarly to the cases shown in FIGS. 13 and 14 shown above except that the direction in which the compensating member 310 is moved when a parallax is compensated becomes horizontal, and a parallax between the light-transmitting unit 200 and the light-receiving unit 400 can be compensated.

Other than the above-mentioned lens, a prism or an apex angle-variable prism that allows the angle between an entrance surface and an exit surface to be changed can be used as the compensating member 312 to compensate a parallax. Furthermore, the position of the light-emitting unit 210 or the position of the light-receiving element 430 may be shifted according to a parallax amount, that is, a measurement distance.

Note that in order to perform compensation according to a parallax amount, that is, a measurement distance, the user may instruct to switch the distance measurement range by switch manipulation or the like. Alternatively, it may be determined that a parallax has been generated when a distance cannot be measured even when the number of times of the distance measurement operation has reached the above-mentioned number of trials, and the distance measurement operation may be performed by performing scanning with reflected light from the target object 20 that is at a short distance from the compensating member 310 in a direction that allows light reception to measure the distance at a position at which high incoming light intensity is obtained. By performing calibration in this manner, parallax compensation can be performed without a switching operation by the user.

Note that preferably the drive center of the compensating member 310 by the compensation control unit 330 of the compensating unit 300 and the center of the light-receiving unit 400 are set such that they match each other when a distance from the distance measuring apparatus 10 to the target object 20 is sufficiently long and parallax compensation is not needed.

Also, when a shake-preventing operation is performed in a state where the inclination of the optical path is adjusted to compensate a parallax, at least, the compensation control unit 330 of the compensating unit 300 preferably displaces the compensating member 310 symmetrically about a perpendicular line that connects the optical axes of the light-transmitting unit 200 and the light-receiving unit 400.

Note that when light in the infrared band or ultraviolet ray band is used as signal light, there is a difference generated between the shake-preventing coefficients of the sighting optical system and the light-transmitting optical system due to chromatic aberration, and an angular difference, that is, a parallax, is generated in the optical axes at the time of performing a shake-preventing operation. Because this parallax results in occurrence of a displacement in the position onto which signal light is irradiated relative to the position targeted at by the sighting optical system, it is disadvantageous when a distance to a small object is measured.

On the other hand, the size of a light-emitting surface of a light-emitting element such as a light-emitting diode forming the light-emitting unit 210 is finite. For this reason, even when parallel light is obtained via a light-transmitting optical system, it has a spread angle of a certain degree, that is, an angle of view determined by the size of the light-emitting surface and the focal distance of the light-transmitting optical system. Therefore, if a parallax is within a range of the spread angle of the light flux of signal light, a displacement between the sighting position and the signal light irradiated position is not practically a program.

Note that because the light-emitting surface of a light-emitting element generally has an approximately linear or rectangular shape, the spread angle of a beam does not become rotation-symmetric even if parallel light is obtained by an optical system, and the spread angle becomes large within a plane, and becomes small within a plane that is orthogonal thereto. Therefore, a tolerated parallax is considered within a plane on which the spread is small.

In an operation of changing an optical path by the compensating unit 300, a condition of signal light entering the light-receiving element 430 can be expressed as in Equation 8 shown below assuming that the ratio of an image movement amount on an image plane relative to the movement amount of a moving lens group including a DOE, a liquid crystal lens or the like is a shake-preventing coefficient k. Note that "kd" denotes a shake-preventing coefficient relative to a d-line of the compensating member 310, "kL" denotes a shake-preventing coefficient relative to signal light of the compensating member 310, "a" denotes the length of a short axis of the light-emitting surface of the light-emitting unit 210, and "s" denotes the maximum eccentricity amount of the compensating member 310.

$|kd-KL|s<a$  (Equation 8)

In this manner, when the optical path is changed by the compensating unit 300, in some cases, there is a difference generated between sighting performed in the visible light band and displacement of the optical path in the signal light. Therefore, the compensating unit 300 may be formed by taking into consideration a tolerated range of a parallax between the sighting optical system and the light-transmitting optical system.

Also, the shake-preventing coefficient can be expressed as in Equation 9 shown below by using a magnification PB of the compensating member 310 and 13r of the entire magnification of a lens group on the image side of the compensating member 310.

Shake-preventing coefficient=$|(1-\beta v)\times \beta r|$  (Equation 9)

In this case, assuming that the shake-preventing coefficient of the compensating member 310 relative to the d-line is kd, and the eccentricity amount of the compensating member 310 is s, the image plane moving amount of the sighting system is kd·s. Similarly, assuming that the shake-preventing coefficient relative to the oscillation wavelength of signal light is kL, the image plane moving amount is kL·s. As shown in Equation 10 shown below, if a difference between these image plane moving amounts is always smaller than a half of the length of the light-emitting element light-emitting surface of the light-emitting unit 210, the optical axis of the sighting system never deviates from the light flux of the signal light even when the compensating member 310 is displaced.

$|kd-kL|s_{max}<a/2$  (Equation 10)

Note that "$s_{max}$" denotes the maximum value of the eccentricity amount of the compensating member 310.

Also, in the compensating unit 300, preferably Equations 11 and 12 shown below are satisfied assuming that the shake-preventing coefficient relative to the d-line of the compensating member 310 is kd and the maximum shake compensation angle of the compensating member 310 is θv.

$1.2<kd<2.2$  (Equation 11)

$0.3<\theta v<0.7$  (Equation 12)

Many mechanisms that are placed to surround the outer circumference of an optical element are used currently as means for decentering a lens in a perpendicular direction, and because the eccentricity amount of an optical element that is needed to obtain a practically sufficient shake compensation angle becomes larger when the requirement about the lower limit is not satisfied, the diameter of the decentering mechanisms has to be made larger; as a result, the casing of a laser distance meter becomes larger in size. For example, in order to attain the compensation angle θv of 0.3° when the shake-preventing coefficient kd is 1.2 and the objective focal distance is 100 mm, the eccentricity s is set to 0.44 mm. Therefore, by satisfying Equation 11 shown above, increase in the dimension of the compensating unit 300 can be suppressed.

Note that when the shake-preventing coefficient kd is higher than the upper limit in Equation 11 shown above, the sensitivity of the compensating unit 300 becomes too high, and manufacture becomes difficult. In other words, when the distance to a far object 20 is considered as being infinite, and the sighting unit 100 and the light-transmitting unit 200, and the light-receiving unit 400 are made independent of each other, the optical axis of the light-transmitting unit 200 and the optical axis of the light-receiving unit 400 are required to be made parallel in order to receive signal light reflected on the target object 20

However, if the sensitivity of the compensating unit 300 is too high, it is possible that the optical axis of the light-transmitting unit 200 is biased due to displacement of the central position at the time of manufacture, and signal light cannot be received. For this reason, when adjusting the position of the optical element of the compensating unit 300 at the time of manufacture, it takes time to make an adjustment due to excessively high sensitivity.

Also, when the compensation angle θv is outside the range in Equation 12 shown above, a sufficient compensation angle is not obtained, or the size of the compensating unit 300 becomes large. For example, in order to attain the compensation angle θv of 0.7° when the shake-preventing coefficient kd is set to 2.2 and the objective focal distance is set to 100 mm, the eccentricity amount is set to 0.56 mm. Therefore, by satisfying Equation 12 shown above, increase in the dimension of the compensating unit 300 can be suppressed.

Figure 16:
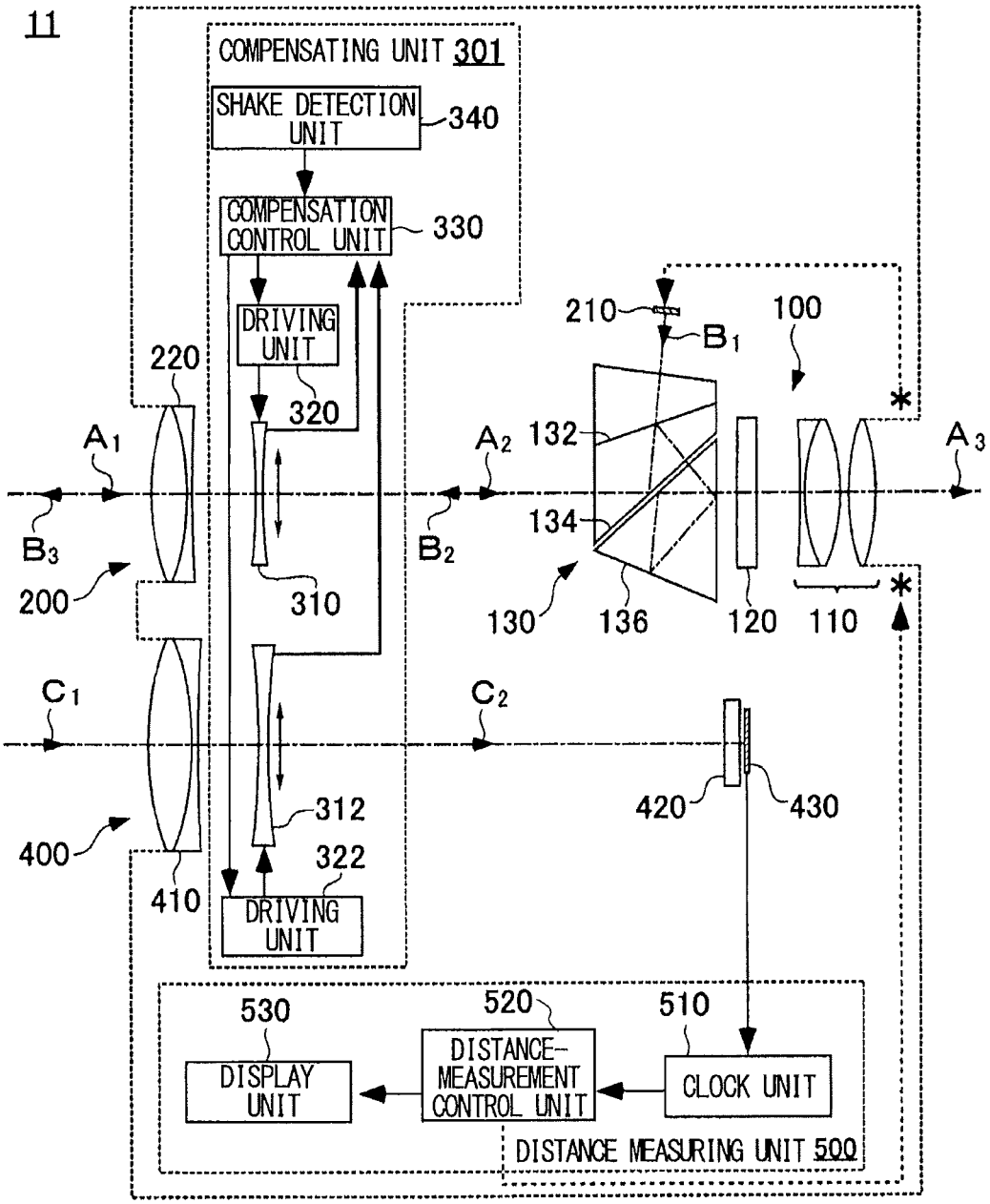
FIG. 16 is a schematic cross-sectional view of a distance measuring apparatus 11.

FIG. 16 is a schematic cross-sectional view of a distance measuring apparatus 11 provided with another compensating unit 301. The distance measuring apparatus 11 has the same structure as that of the distance measuring apparatus 10 shown in FIG. 1 except for the structure of the compensating unit 301 to be explained next. So the common elements are provided with the same reference numbers, and overlapping explanation is omitted.

In addition to the compensating member 310 and the driving unit 320 disposed in the light-transmitting unit 200, the compensating unit 301 of the distance measuring apparatus 11 has a compensating member 312 and a driving unit 322 disposed in the light-receiving unit 400. The compensating member 312 of the light-receiving unit 400 includes a lens constituting part of the optical system of the light-receiving unit 400.

Under control of the compensation control unit 330, the driving unit 322 displaces the compensating member 312 in a direction to cross the optical axis of the compensating member 312. Thereby, the optical path of the beam $C_2$ propagated in the distance measuring apparatus 10 in the (−Y)-direction can be changed, and the position at which the spot image of the signal light is formed in the light-receiving element 430 can be changed.

In the compensating unit 301, the driving unit 322 may be controlled in common by the compensation control unit 330 that controls the driving unit 320. Thereby, the compensating member 312 can be displaced in synchronization with the compensating member 310. Here, the phrase "displaced in synchronization" means that a pair of the compensating members 310, 312 is moved simultaneously, and also means that changes in the optical paths that are generated by the movement of the compensating members 310, 312 correspond to each other.

Note that a lens or a prism can be used as the compensating member 312. Also, an apex angle-variable prism that allows the angle formed between an entrance surface and an exit surface to be changed can be used.

Figure 17:
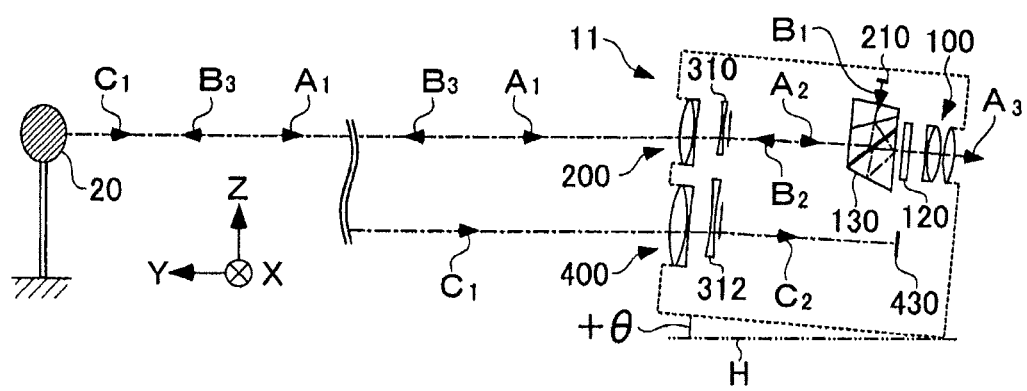
FIG. 17 is a schematic view for explaining a compensating operation of a compensating unit 301.

FIG. 17 is a schematic view for explaining a compensating operation of the compensating unit 301. The distance measuring apparatus 10 has rotated clockwise in the figure from the state shown in FIG. 2, and is inclined relative to the horizontal plane H by an angle $(+\theta_0)$. Thereby, the front end of the distance measuring apparatus 10 is displaced in the Z direction, and the optical axis of the object optical system 220 points above the target object 20 in the figure.

In the compensating unit 301, the shake detection unit 340 detects rotation of the distance measuring apparatus 10, and displaces the compensating member 310 in the Z direction by means of the driving unit 320. Thereby, the beam $A_1$ propagated from the target object 20 toward the distance measuring apparatus 10 horizontally in the (−Y)-direction is propagated inside the distance measuring apparatus 10 as the beam $A_2$ inclined by the same degree as the inclination of the distance measuring apparatus 10. Therefore, an image blur in the sighting unit 100 is compensated. Also, the projection direction of the signal light projected from the object optical system 220 is compensated and is not displaced.

Also, the optical path of the beam $B_2$ of signal light tilted together with the distance measuring apparatus 10 inside the distance measuring apparatus 10 is compensated to be horizontal by the compensating member 310. Thereby, the beam $B_3$ of signal light that is emitted from the distance measuring apparatus 10 and propagated in the Y direction is still projected onto the target object 20.

The signal light projected onto the target object 20 is reflected by the target object 20, and part thereof enters the light-receiving unit 400 as the beam $C_1$, its propagation optical path is compensated by the compensating member 312, and then the beam $C_1$ is propagated as the beam $C_2$ in the distance measuring apparatus 10. The compensated optical path of the beam $C_2$ is parallel with the beam $A_2$ in the sighting unit 100 and the beam $B_2$ in the light-transmitting unit 200, and the beam $B_2$ forms a spot image at an approximate center of the light-receiving region 431 of the light-receiving element 430. Thereby, the distance measuring unit 500 displays for the user a distance calculated based on the propagation time of the signal light.

In this manner, in the distance measuring apparatus 11, the propagation optical path of the beam $C_2$ in the light-receiving unit 400 is compensated to be parallel with the beam $A_2$ in the sighting unit 100 and the beam $B_2$ in the light-transmitting unit 200 due to compensation by the compensating unit 301. Therefore, similarly to displacement of an image of the sighting unit 100 being compensated by the compensating member 310, and also similarly to the projection direction of signal light in the light-transmitting unit 200 being compensated, in the light-receiving unit 400, the position of the spot image of the signal light in the light-receiving element 430 is compensated. Therefore, the compensation range of the compensating unit 301 is never limited by the light-receiving range of the signal light received by the light-receiving element 430.

Note that in the above-described example, the compensating member 310 of the light-transmitting unit 200 and the compensating member 312 of the light-receiving unit 400 are displaced in synchronization. However, without synchronizing the compensating members 310, 312, they may be controlled separately by fixing one of them while the other is being displaced. For example, the compensating operation is performed by the compensating member 310 on the light-transmitting unit 200 side first, and when the spot image of signal light reaches an edge of the light-receiving range of the light-receiving element 430, the compensating member 312 on the light-receiving unit 400 side may be driven. Thereby, effectively, the same compensation range as in the above-described example can be attained, and power can be saved correspondingly by reducing displacement of one compensating member 312.

Also, for example, while shake compensation is executed by using the compensating member 310 and the driving unit 320 on the light-transmitting unit 200 side, parallax compensation may be executed by using the compensating member 312 and the driving unit 322 on the light-receiving unit 400 side. In this case, about shake compensation, the compensating member 312 on the light-receiving unit 400 side is not displaced, and about parallax compensation, the compensating member 310 on the light-transmitting unit 200 side is not displaced. Thereby, high distance measurement accuracy particularly about the target object 20 that is at a short distance can be maintained while preventing an image blur.

Furthermore, when shake compensation and parallax compensation are executed together, shake compensation may be executed by using the compensating member 310 and the driving unit 320 on the light-transmitting unit 200 side at a step of sighting the target object 20, and parallax compensation may be executed by using the compensating member 312 and the driving unit 322 on the light-receiving unit 400 side by terminating the shake compensation at a step when the user instructs to start distance measurement. Thereby, prevention of an image blur and improvement of distance measurement accuracy can be achieved while suppressing the peak value of power consumption.

FIG. 18 is a schematic cross-sectional view of a distance measuring apparatus 12 provided with another compensating unit 302. The distance measuring apparatus 12 has the same structure as those of the distance measuring apparatus 10 shown in FIG. 1 and the distance measuring apparatus 11 shown in FIG. 16 except for the structure of the compensating unit 302 to be explained next. So the common elements are provided with the same reference numbers, and overlapping explanation is omitted.

The compensating unit 302 of the distance measuring apparatus 12 is not provided with the compensating member 310 in the sighting unit 100 and the light-transmitting unit 200, and has the compensating member 312 and the driving unit 322 disposed in the light-receiving unit 400. The compensating member 312 includes a lens constituting part of an afocal optical system included in the light-receiving unit 400.

The driving unit 322 displaces the compensating member 312 in a direction to cross the optical axis of the compensating member 312. Thereby, the optical path of the beam $C_2$ propagated in the distance measuring apparatus 10 in the (−Y)-direction can be changed, and the position at which the spot image of the signal light is formed in the light-receiving element 430 can be changed. The driving unit 322 is controlled by the compensation control unit 330 that refers to an output of the shake detection unit 340.

FIG. 19 is a schematic view for explaining a compensating operation of the compensating unit 302. The distance measuring apparatus 12 is in a horizontal state similar to the state shown in FIG. 2. On the other hand, the target object 20 is close to the distance measuring apparatus 10, and an unneglible parallax is generated between the light-transmitting unit 200 and the light-receiving unit 400 of the distance measuring apparatus 10. So, parallax compensation described in the explanation of FIG. 14 is performed.

Furthermore, because due to the compensating member 312, the optical path of the beam $C_2$ can be changed so that the signal light is received by the light-receiving element 430, the area of the light-receiving region 431 of the mounted light-receiving element 430 can be made small. Thereby, the SN ratio of signal light can be made high, and the component cost of the light-receiving element 430 can be reduced. Note that with the above-described structure, the light-receiving element 430 can receive signal light in a wide range of the angle of incidence. Therefore, preferably signal light irradiated from the light-transmitting unit 200 is irradiated onto a wide range including the target object 20 by radiating the signal light onto a wide angle.

As described above, the compensating unit 300 can be used for use in which parallax compensation is performed when a distance to the target object 20 is short. Furthermore, compensation of displacement of the distance measuring apparatus 10 due to a shake or the like and compensation of a parallax due to the position of the target object 20 may be executed together.

Note that in the above-described series of the distance measuring apparatuses 10, 11, 12, compensating operation by the compensating units 300, 301, 302 may be changed according to the state of the distance measuring apparatus 10. In other words, for example, during a period in which the user is sighting the target object 20, the range of compensation may be made larger so that it is easier to capture the target object 20.

On the other hand, when the distance measuring unit 500 has started the distance measurement operation, the compensating operation may be suppressed or terminated temporarily for a purpose of suppressing a difference between optical conditions of the light-transmitting unit 200 and the light-receiving unit 400. Because time required for one distance measurement operation is short, influence on an image observed by the user in the sighting unit 100 is small even if the compensating operation is suspended according to execution of the distance measurement operation.

Also, one cause for displacement of the distance measuring apparatus 10 is a shake of the user. However, there are various patterns of a shake, and a single compensation algorithm is not necessarily effective always. So, a plurality of compensation algorithms to be executed by the compensation control unit 330 may be prepared, and the compensation algorithms may be switched over depending on a pattern of a shake detected by the shake detection unit 340.

More specifically, when at least one of the amplitude and frequency of a shake detected by the shake detection unit 340 exceeds a predetermined threshold, a compensation algorithm to be executed by the compensation control unit 330 may be switched. More specifically, placing importance on suppression of distance measurement time, power consumption or the like, an operation mode in which the compensation range of the compensating unit 300 is made smaller may be provided.

Conversely, assuming a user who is not skilled in manipulation of the distance measuring apparatus 10, an operation mode in which the compensation range is made as large as possible, and when the compensation limit is reached, a message suggesting cautious manipulation to the user is displayed may be provided. The operation modes may be switched depending on selection of the user, or may be switched automatically according to determination made by the compensation control unit 330, the distance-measurement control unit 520 or the like.

Furthermore, when a period in which a shake is not detected lasts longer than predetermined time at Step S201, the compensating unit 300 or the entire distance measuring apparatus 10 may be brought into a state where power consumption is suppressed.

Furthermore, in the above-described example, the compensating members 310, 312 are provided to the object optical systems 220, 410. However, for example, the erecting prism 130 can be partially or entirely used as the compensating member 310. Also, part of the eyepiece optical system 110 can be used as the compensating member 310. Furthermore, when a liquid crystal display panel or the like is used for the sighting unit 100, an electronic compensating member may be used.

The compensating units 300, 301, 302 described above may be provided with a switch for turning on and off, and able to measure distances with the distance measuring apparatus 10 without the compensating operation. Thereby, when it is easy to perform sighting for example because the target object 20 is located nearby, the operation of the compensating units 300, 301, 302 can be terminated according to the will of the user, and power of the distance measuring apparatus 10 can be saved.

Figure 20:
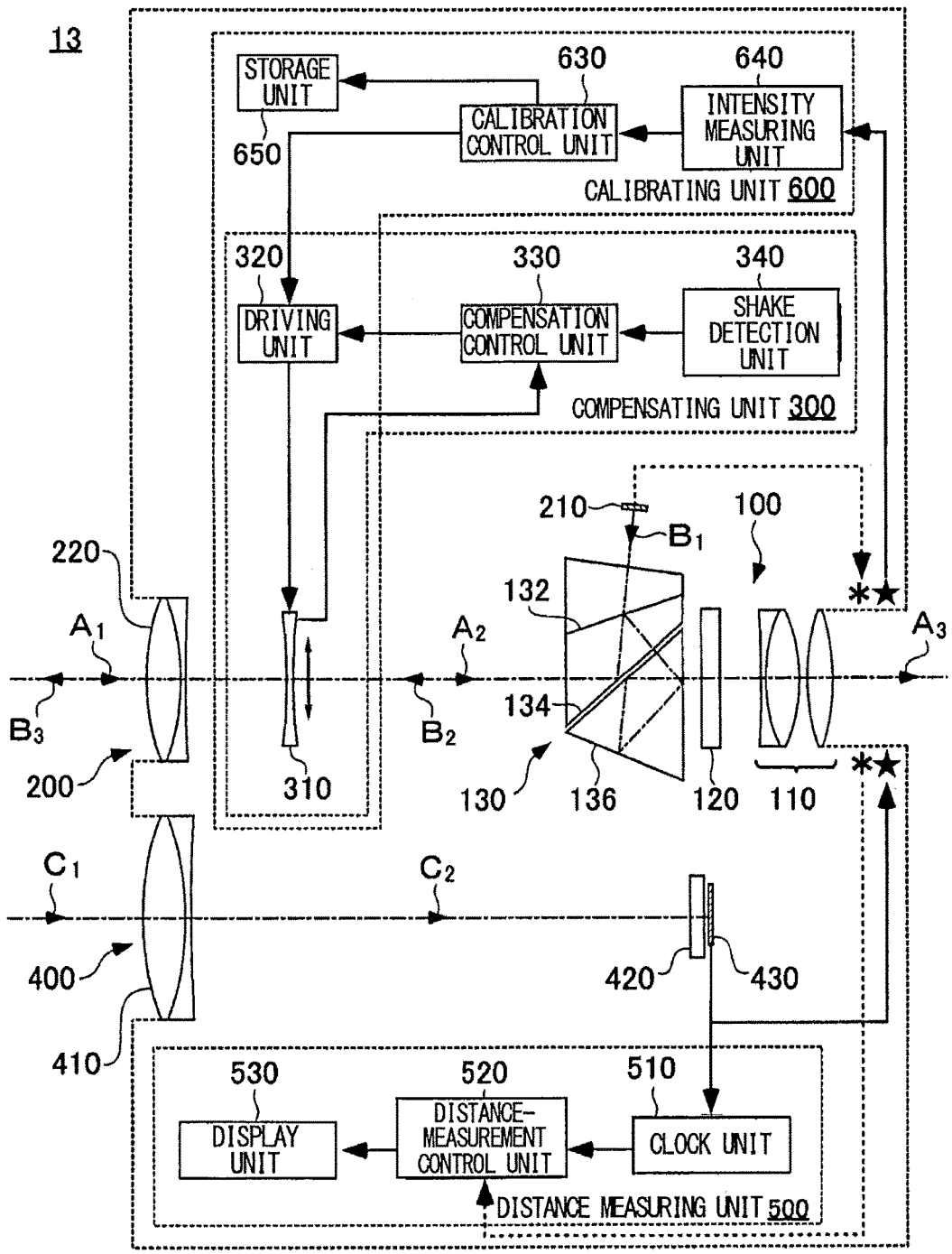
FIG. 20 is a schematic cross-sectional view of a distance measuring apparatus 13.

FIG. 20 is a schematic cross-sectional view of a distance measuring apparatus 13. The distance measuring apparatus 13 includes the sighting unit 100, the light-transmitting unit 200, the calibrating unit 600, the light-receiving unit 400, the distance measuring unit 500 and the compensating unit 300. Note that in the following explanation, the side on which the sighting unit 100 is placed is defined as the rear side of the distance measuring apparatus 13. Also, the side to face a target of distance measurement is defined as the front side of the distance measuring apparatus 13.

The sighting unit 100 includes the eyepiece optical system 110, the reticle plate 120 and the erecting prism 130. The sighting unit 100 shares the object optical system 220 with the light-transmitting unit 200. Also, the sighting unit 100 shares the compensating member 310 with the calibrating unit 600 and the compensating unit 300.

The rear end of the eyepiece optical system 110 is exposed at the rear end surface of the distance measuring apparatus 13. The front end of the eyepiece optical system 110 faces the rear end of the erecting prism 130 inside the distance measuring apparatus 13. A user of the distance measuring apparatus 13 sights a target object by viewing an image of the target object through the eyepiece optical system 110.

Note that an optical member to change the imaging position of the eyepiece optical system 110 in the optical axis direction may be provided as part of the eyepiece optical system 110 or in addition to the eyepiece optical system 110. Thereby, the user can observe a clear image regardless of the distance to the target object. Also, diopter compensation according to the eyesight of the user can be performed.

The reticle plate 120 has a reticle formed by printing, etching or the like on a plate that is transparent to visible light. The reticle constitutes a sighting index that has a shape such as cross-hairs, a rectangular frame, a circular frame or the like, and is disposed within the field of view formed by the eyepiece optical system 110. A transmissive liquid crystal display panel that displays the reticle as an image may be used as the reticle plate 120.

The erecting prism 130 has the dichroic reflection surface 132 that reflects the visible light band and allows transmission of the infrared band, and the total reflection surfaces 134, 136 that have high reflectance for the visible light band and the infrared band. The erecting prism 130 has another reflection surface which is not provided with a reference number and reverses an inverted mirror image formed by an incident beam into an erect normal image. The erecting prism 130 can be formed by using a Dach prism, a Porro prism or the like.

The light-transmitting unit 200 has the light-emitting unit 210 and the object optical system 220. Also, the light-transmitting unit 200 shares part of the erecting prism 130 including the dichroic reflection surface 132 and the total reflection surface 134 with the sighting unit 100. Furthermore, as explained already, the compensating member 310 is shared by the calibrating unit 600 and the compensating unit 300.

The light-emitting unit 210 includes a light-emitting element such as a semiconductor laser as a light source, and emits pulsed signal light when the distance measuring apparatus 13 performs a distance measurement operation. In the present embodiment, signal light is infrared light, for example.

Note that the wavelength of the signal light may be another wavelength other than the visible band such as a ultraviolet ray. When the signal light is a ultraviolet ray, the dichroic reflection surface 132 of the erecting prism 130 reflects the visible light band and allows transmission of the ultraviolet band. Also, the total reflection surface 134 reflects the visible light band and the ultraviolet band.

The object optical system 220 is disposed at the front end of the distance measuring apparatus 13, and faces a target object whose front side end surface is a target of distance measurement. The rear side end surface of the object optical system 220 faces the front side end surface of the erecting prism 130 with the compensating member 310 being sandwiched therebetween. The object optical system 220 and the compensating member 310 form a light-transmitting optical system in cooperation with each other.

Note that an optical member to change the imaging position of the object optical system 220 in the optical axis direction may be provided as part of the object optical system 220 or in addition to the object optical system 220. Thereby, a clearer image can be observed in the sighting unit 100, and the target object to be a target of distance measurement can be selected accurately by narrowing the beam diameter of the signal light.

The calibrating unit 600 and the compensating unit 300 share the compensating member 310 and the driving unit 320 with each other. The compensating member 310 forms an optical system together with the eyepiece optical system 110 and the object optical system 220. The driving unit 320 displaces the compensating member 310 in a direction to cross the optical axis of the compensating member 310. Furthermore, the driving unit 320 may swing the compensating member 310 in a direction in which the principal surface swings.

Note that other than a lens that is displaced, a prism that swings may be used as the compensating member 310. Also, an apex angle-variable prism whose apex angle formed between an entrance surface and an exit surface can be changed by swinging a member forming the entrance surface or the exit surface can be used as the compensating member 310. The driving unit 320 is provided with an actuator such as a voice coil motor, a piezoelectric motor or the like whose drive amount can be controlled electrically.

The light-receiving unit 400 has the object optical system 410, the band transmitting filter 420 and the light-receiving element 430. The object optical system 410 has an optical axis that is different from that of the object optical system 220 of the light-transmitting unit 200 and forms the light-receiving optical system.

In the light-receiving unit 400, the band transmitting filter 420 and the light-receiving element 430 are sequentially disposed behind the object optical system 410. The band transmitting filter 420 has a property of allowing transmission of light in a narrow band including signal light and blocking or attenuating light of other bands. The light-receiving element 430 includes a photoelectric conversion element such as a photodiode or a phototransistor that is sensitive to the band of signal light. Thereby, the light-receiving element 430 detects signal light that has entered thereto, and generates an electrical signal corresponding to the signal light detected.

Note that preferably the light-receiving area of the light-receiving element 430 is smaller in terms of excluding influence of background light in detection of signal light. An optical member to change the imaging position of the object optical system 410 in the optical axis direction may be provided as part of the object optical system 410 or in addition to the optical system. Thereby, the light-receiving element 430 can be allowed to receive smaller spot light by narrowing the beam diameter of the signal light received.

Among light reflected or scattered from a target object located in front of the distance measuring apparatus 13, the beam $A_1$ that is propagated within a range of the angle of view of the object optical system 220 enters the thus-structured distance measuring apparatus 13 through the object optical system 220. The beam $A_1$ is transmitted through the compensating member 310, is propagated as the beam $A_2$ backward inside the distance measuring apparatus 13, and is emitted as the beam $A_3$ backward from the distance measuring apparatus 13 through the erecting prism 130, the reticle plate 120, and the eyepiece optical system 110. Thereby, the user can observe an erect normal image of a target object through the eyepiece optical system 110.

The reticle disposed on the reticle plate 120 is superimposed on an image of the target object that the user observes through the eyepiece optical system 110. Therefore, the user can sight the target object by the distance measuring apparatus 13 by matching the reticle with the target object by displacing the distance measuring apparatus 13.

The user of the distance measuring apparatus 13 instructs the distance measuring apparatus 13 to start a distance measurement operation for example by switch manipulation of a button or the like provided to the distance measuring apparatus 13. When the user instructs the distance measuring apparatus 13 to measure a distance, the light-emitting unit 210 emits pulsed signal light as the beam $B_1$ toward the upper surface of the erecting prism 130 in the figure. In the erecting prism 130, the signal light is transmitted through the dichroic reflection surface 132, is reflected on the total reflection surface 134, and is propagated as the beam $B_2$ forward inside the distance measuring apparatus 13.

Furthermore, the signal light is projected as the beam $B_3$ externally forward from the distance measuring apparatus 13 through the compensating member 310 and the object optical system 220. The signal light projected as the beam $B_3$ is projected onto the target object of distance measurement that has been sighted. When the distance to the target object of distance measurement is assumed to be several hundred meters, the spread of the projected signal light is set to approximately ±0.05° for example.

The compensating member 310 allows transmission of the beam $A_2$ that has entered into the distance measuring apparatus 13 and the beam $B_2$ emitted from the distance measuring apparatus 13 near the object optical system 220. When the optical axis of the compensating member 310 is displaced by being driven by the driving unit 320, the optical path of each of the beams $A_2$, $B_2$ is displaced, and its propagation direction changes.

By the propagation direction of the beam $A_2$ being displaced, an image observed by the user through the sighting unit 100 is displaced. In other words, by appropriately displacing the compensating member 310 when the distance measuring apparatus 13 is displaced, displacement of an image observed by the user can be stopped.

Furthermore, when the optical axis of the compensating member 310 is displaced, the propagation direction of the beam $B_2$ is displaced Thereby, the propagation direction of the beam $B_3$ of the signal light projected externally is displaced. Therefore, by appropriately displacing the compensating member 310 when the distance measuring apparatus 13 is displaced, the irradiation target of the signal light can be maintained.

The beam $C_1$ reflected or scattered from a target object located in front of the distance measuring apparatus 13 enters the object optical system of the light-receiving unit 400. The beam $C_1$ is propagated as the beam $C_2$ backward inside the distance measuring apparatus 13, and is received by the light-receiving element 430 after being transmitted through the band transmitting filter 420.

Therefore, the light-receiving element 430 detects the signal light included in the beams $C_1$, $C_2$ that have entered thereto at a high SN ratio, and generates an electrical signal. The electrical signal generated by the light-receiving element 430 is input to the distance measuring unit 500.

Note that although the single driving unit 320 is described in the figure, another driving unit 320 to displace the compensating member 310 in a direction to cross the sheet surface is further provided together. Thereby, the compensating member 310 can be displaced two-dimensionally within a plane to cross the propagation optical axis of the beam $C_2$.

The distance measuring unit 500 has the clock unit 510, the distance-measurement control unit 520 and the display unit 530. The clock unit 510 measures time from the moment at which the light-transmitting unit 200 transmits signal light to the moment at which the signal light reflected on a target object is received.

The distance-measurement control unit 520 performs overall control of a distance measurement operation in the distance measuring apparatus 13. A target of control by the distance-measurement control unit 520 includes the light-emitting unit 210 of the light-transmitting unit 200 and the like. Also, the distance-measurement control unit 520 calculates the distance between the distance measuring apparatus 13 to the target object based on the time measured by the clock unit 510.

Note that if the distance measuring apparatus 13 has a function of detecting an inclination or the like, the distance-measurement control unit 520 may calculate a horizontal distance to the target object, a difference in height or the like. Furthermore, the clock unit 510 may compensate calculation results in accordance with environmental changes such as temperature.

The display unit 530 has a liquid crystal display panel or the like, and shows, by means of characters, images or the like, to the user a calculation result of the distance-measurement control unit 520 such as the distance to a target object. Other than distance measurement results, the display unit 530 may display a battery remaining amount, error messages, a clock or the like together.

Furthermore, the display unit 530 may display a message to call the user's attention about holding of the distance measuring apparatus 13 when the amplitude or frequency of a shake detected by the shake detection unit 340 mentioned below exceeds a predetermined threshold. Thereby, power consumed by the distance measuring apparatus 13 can be saved by reducing a burden on the calibrating unit 600.

The calibrating unit 600 has a calibration control unit 630, an intensity measuring unit 640 and a storage unit 650. Also, the calibrating unit 600 shares the driving unit 320 with the compensating unit 300.

The intensity measuring unit 640 refers to an output signal of the light-receiving element 430 and measures light intensity of signal light received by the light-receiving element 430. Note that the clock unit 510 of the distance measuring unit 500 detects temporal timing at which the light-receiving element 430 receives signal light. In contrast, the intensity measuring unit 640 for example measures whether or not light intensity higher than a predetermined threshold has been detected.

The calibration control unit 630 sends a command to the driving unit 320 to displace the compensating member 310. Also, when the light intensity measured by the intensity measuring unit 640 exceeds the threshold, the calibration control unit 630 specifies a drive amount of the compensating member 310 by the driving unit 320. Furthermore, the calibration control unit 630 stores and saves the specified drive amount of the compensating member 310 in the storage unit 650.

As described above, the compensating unit 300 to compensate an image blur generated in the sighting unit 100 and the light-transmitting unit 200 can be formed by utilizing the compensating member 310 and the driving unit 320 that constitute part of the calibrating unit 600. Because the calibration operation and the distance measurement operation are never executed simultaneously, utilization efficiency of components in the distance measuring apparatus 10 can be improved by the above-described structure.

Figure 21:
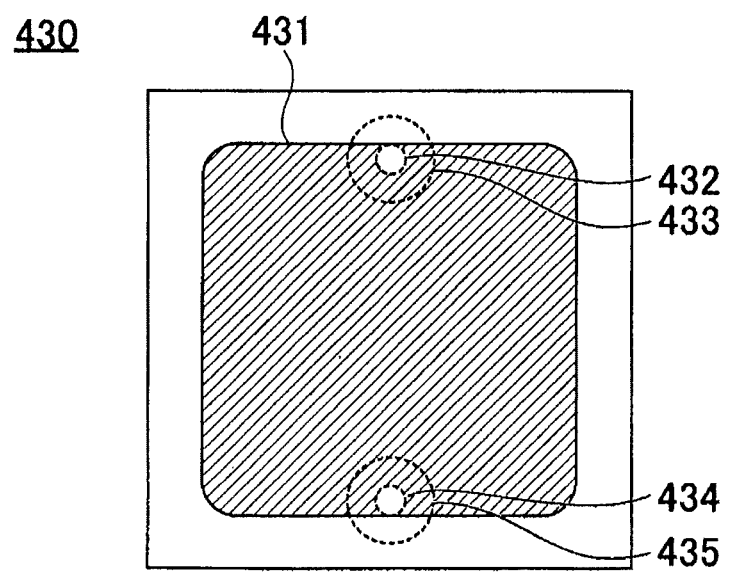
FIG. 21 is a figure showing a spot image formed in the light-receiving element 430.

FIG. 21 is a figure schematically showing a spot image of signal light formed in the light-receiving element 430. As described above, when a distance from the target object 20 of distance measurement to the distance measuring apparatus 13 has changed, the positions, on the light-receiving region 431 of the light-receiving element 430, of the spot images 432, 434 formed by signal light reflected by the target object 20 change.

For example, as shown in FIG. 2, when the target object 20 is at the far distance $D_L$ from the distance measuring apparatus 13, the spot image 432 of signal light is formed on the upper end side in the figure of the light-receiving region 431. Also, as shown in FIG. 11, when the target object 20 is at the short distance $D_S$ from the distance measuring apparatus 13, the spot image 434 of signal light is formed on the lower end side in the figure of the light-receiving region 431.

Furthermore, when the target object 20 approaches the distance measuring apparatus 13 further from the illustrated state, the spot image 434 of signal light moves downward from the light-receiving region 431, and the signal light is no longer received by the light-receiving element 430. Therefore, the position at which the spot image 434 reaches the lower end in the figure of the light-receiving region 431 is a distance measurement limit of the distance measuring apparatus 13.

In view of such a structure of the distance measuring apparatus 13, when the optical system of the distance measuring apparatus 13 is to be calibrated, for example, if the target object 20 is at the lower limit of the distance measurement range set by the distance measuring apparatus 13, the optical system is adjusted such that the spot image 434 is located at the inner side of the light-receiving region 431 than the lower end of the light-receiving region 431, and the light-receiving element 430 detects the light intensity of signal light.

Note that due to diffusion on a propagation path, the beam $C_2$ entering the light-receiving element 430 in the distance measuring apparatus 13 has a larger diameter than the spot images 432,434 formed by the beam $C_2$ that went straight on as shown by the diffusion regions 433, 435 with dotted lines in the figure. For this reason, even if the main beam entering the light-receiving unit 400 deviates from the light-receiving region 431, a state where distance measurement can be performed is maintained as long as part of the beam $C_1$ originated from the signal light is within the angle of view of the light-receiving unit 400. Therefore, when the distance measuring apparatus 13 is to be calibrated, the optical system may be adjusted by anticipating a wider range than the range in which the spot images 432, 434 are formed in the light-receiving region 431.

Also, the shape of the light-receiving region 431 of the light-receiving element 430 is of course not limited to a rectangle. Rather, taking into consideration that the compensation range of the calibrating unit 600 is defined by the shape of the light-receiving region 431, the shape of the light-receiving region 431 may be a circle in which intervals from the center to edge portions are uniform. Thereby, the compensation range of the calibrating unit 600 can be made equal in all the directions. Also, an optical member having a positive refractive index may be provided in front of the light-receiving element 430 to condense the beam $C_2$ of the signal light onto the light-receiving element 430.

The optical system of the distance measuring apparatus 13 manufactured is, before shipment, calibrated such that signal light reflected by a target object of distance measurement is received by the light-receiving element 430. Thereby, the distance measuring apparatus 13 ensures the distance measurement accuracy and the distance measurement range conforming to its specification. However, in some cases, the distance measurement accuracy and the distance measurement range of the calibrated distance measuring apparatus 13 change due to causes such as aging resulting from use, external impact or the like.

The distance measurement accuracy of the distance measuring apparatus 13 can be calibrated by measuring a distance of a target object that is arranged at a known distance and comparing the obtained distance with the known distance. When the distance measurement range of the distance measuring apparatus 13 is to be calibrated, the calibrating unit 600 provided to the distance measuring apparatus 13 is used.

Figure 22:
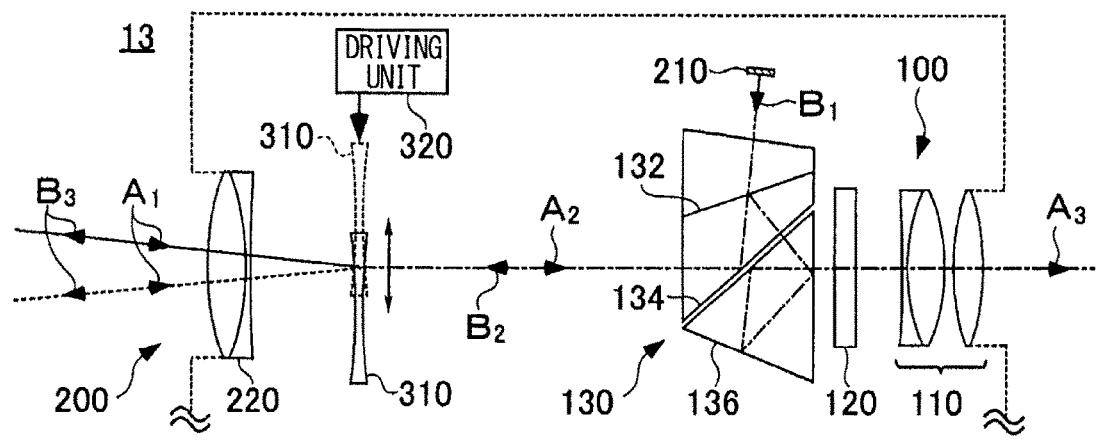
FIG. 22 is a schematic view for explaining an action of a compensating member 310.

FIG. 22 is a schematic view for explaining an action of the compensating member 310 driven by the driving unit 320 in the distance measuring apparatus 13. When driven by the driving unit 320, the compensating member 310 is displaced in a direction that is approximately orthogonal to the propagation direction of the beam $B_2$ of signal light generated by the light-emitting unit 210. Thereby, the propagation directions of the beams $A_2$, $B_2$ transmitted by the compensating member 310 change.

In the illustrated example, the compensating member 310 has negative refractive power. Therefore, as indicated with a solid line in the figure, when the compensating member 310 is displaced downward in the figure, the propagation optical path of the beam $B_2$ is displaced upward in the figure, and is projected externally as the beam $B_3$ indicated with a solid line. Also, after the beam $A_1$ that has entered the object optical system 220 from above in the figure is transmitted through the compensating member 310, it becomes the beam $A_2$ propagated in the distance measuring apparatus 13 horizontally in the figure. Note that when the compensating member 310 has a positive refractive index, the displacement direction of the propagation optical path of a beam relative to the movement direction of the lens is opposite to that in a case the lens has a negative refractive index.

Also, as indicated with a dotted line in the figure, when the compensating member 310 is displaced upward in the figure, the propagation optical path of the beam $B_2$ is displaced downward in the figure, and is projected externally as the beam $B_3$ indicated with a dotted line. Also, after the beam $A_1$ that has entered the object optical system 220 from below in the figure is transmitted through the compensating member 310, it becomes the beam $A_2$ propagated in the distance measuring apparatus 13 horizontally in the figure.

Figure 23:
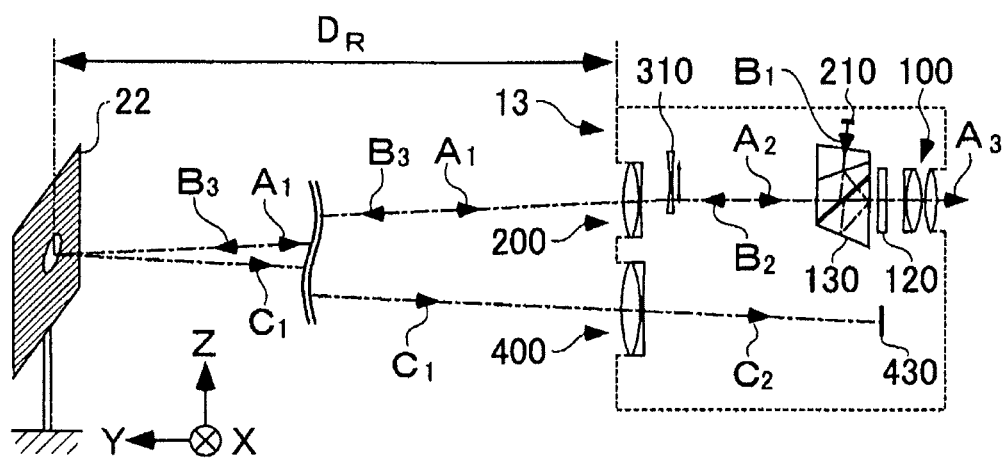
FIG. 23 is a schematic view showing a state of the distance measuring apparatus 13 performing a calibration operation.

FIG. 23 is a schematic view showing a state where a calibration operation to match the distance measurement range of the distance measuring apparatus 13 with a preset range is executed. In calibration of the distance measurement range, the optical system is adjusted such that signal light reflected on a standard target object 22 disposed at a known relative position to the distance measuring apparatus 13 is received by the light-receiving element 430 over the entire area of the distance measurement range.

The relative positions between the distance measuring apparatus 13 and the standard target object 22 meet a condition about a predetermined standard distance $D_R$, and conditions that the height of the distance measuring apparatus 13 and the standard target object 22 are aligned, and that the distance measuring apparatus 13 is oriented to face the standard target object 22 at a right angle. Also, desirably the distance measuring apparatus 13 on which the calibration operation is performed is fixed horizontally, and the standard target object 22 is fixed perpendicularly.

Note that desirably the standard target object 22 has reflectance that has contrast to signal light of the distance measuring apparatus 13. In other words, the standard target object 22 that has a surface with significantly high reflectance or significantly low reflectance as compared with the ambient environment can be used.

Also, the standard target object 22 that have both a region with high reflectance and a region with low reflectance may be used. Furthermore, when the standard target object 22 is used, preferably the standard target object has high contrast also in the visible light band because the distance measuring apparatus 13 is sighted relative to the standard target object 22.

Figure 24:
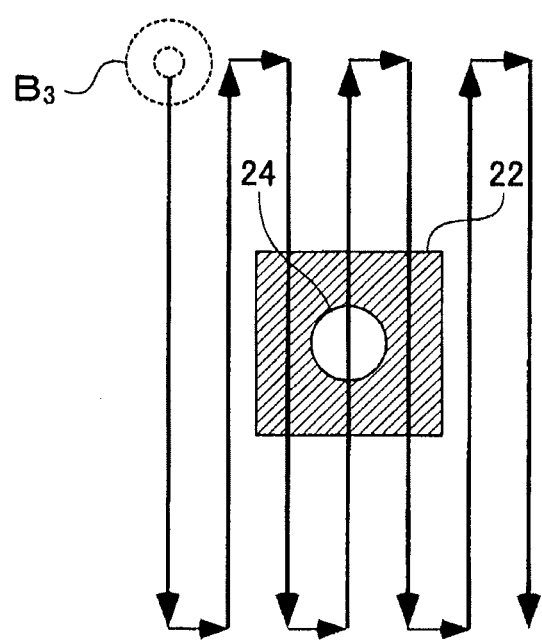
FIG. 24 is a schematic view for explaining scanning with signal light by a calibrating unit 600.

FIG. 24 is a schematic view for explaining a scan pattern about the distance measurement range of the distance measuring apparatus 13. When the distance measurement range of the distance measuring apparatus 13 that is installed in the above-described manner is to be calibrated, first, the reticle of the sighting unit 100 is adjusted visually to the standard target object 22. Next, the compensating member 310 is displaced by the calibration control unit 630 causing the driving unit 320 to operate continuously.

Thereby, as illustrated, the entire field of view of the sighting unit 100 in the distance measuring apparatus 13 is scanned with signal light. Therefore, the signal light is projected onto a region where the standard target object 22 is present and a region where it is not present. Note that a high reflectance region 24 with high reflectance relative to signal light is provided at the center of the standard target object 22 used in this calibration operation.

Figure 25:
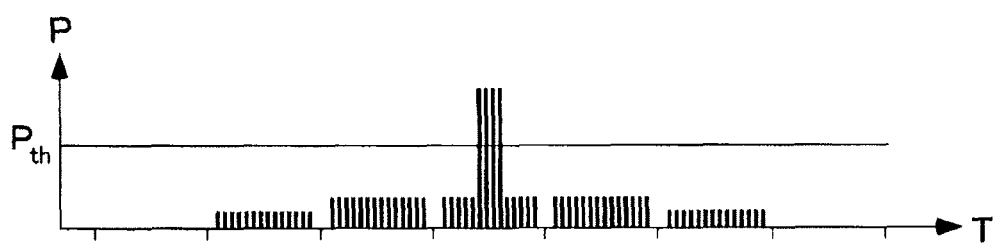
FIG. 25 is a graph showing incoming light intensity of signal light detected by the light-receiving element 430.

FIG. 25 is a graph showing incoming light intensity of signal light detected by the light-receiving element 430 in the calibration operation. In the example shown in FIG. 24, scanning in the field of view of the sighting unit 100 is performed by signal light making three and a half round trips.

In the calibration operation, signal light is not detected in the light-receiving element 430 during a period in which the signal light is not projected onto the standard target object 22. Also, when signal light used for scanning is projected onto the standard target object 22, the incoming light intensity of the signal light reflected on the standard target object in the light-receiving element 430 is measured.

Furthermore, when the signal light used for scanning is projected onto the high reflectance region 24 of the standard target object 22, higher light intensity is measured by the light-receiving element 430. Thereby, the intensity measuring unit 640 measures signal intensity that exceeds a predetermined threshold $P_{th}$.

That is, in the intensity measuring unit 640, the threshold $P_{th}$ is set to be between the incoming light intensity for a case where signal light is reflected in the high reflectance region 24 of the standard target object 22 and the incoming light intensity for a case where signal light is reflected on regions other than the high reflectance region 24 in the standard target object 22. Thereby, the calibration control unit 630 senses that signal light is irradiated onto the center of the standard target object 22.

Figure 26:
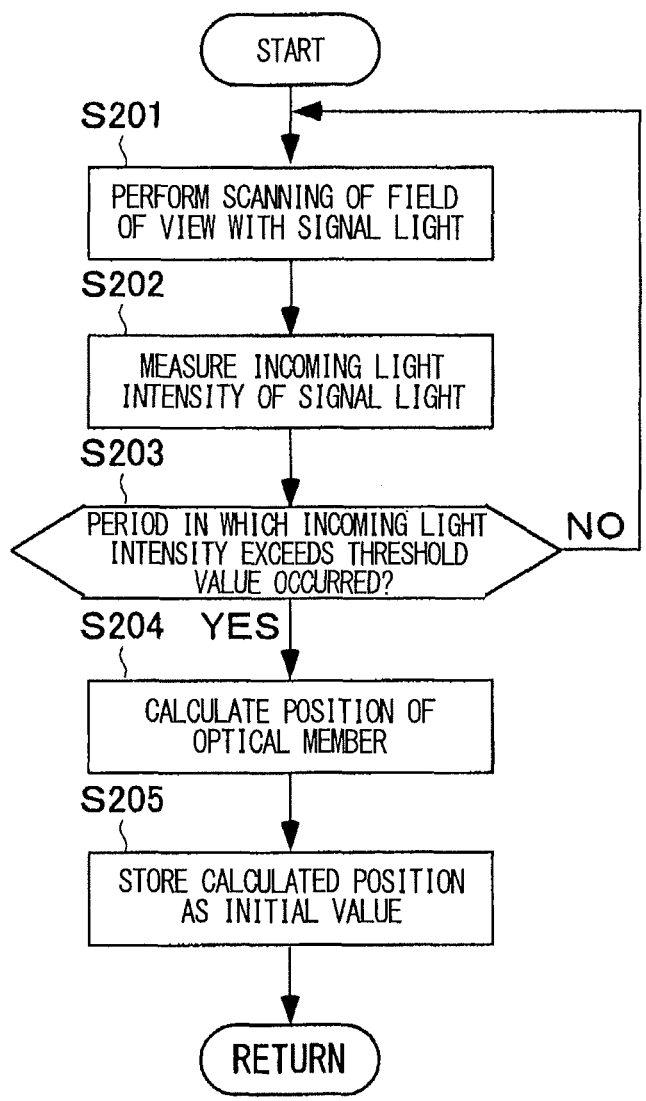
FIG. 26 is a flowchart showing a procedure of a calibration operation of the calibrating unit 600.

FIG. 26 is a flowchart showing a procedure of the calibration operation on the distance measurement range of the calibrating unit 600 as in the above-described manner. As illustrated, when the calibration operation is started, the calibration control unit 630 first generates a command to instruct the driving unit 320 to perform scanning with signal light in the field of view of the sighting unit 100 (Step S201).

Next, the calibration control unit 630 causes the intensity measuring unit 640 to continuously measure the incoming light intensity of signal light received by the light-receiving element 430 (Step S202). Furthermore, the calibration control unit 630 monitors whether the light intensity of signal light measured by the intensity measuring unit 640 exceeds the predetermined threshold $P_{th}$ (Step S203).

Here, if the incoming light intensity of the light-receiving element 430 does not exceed the threshold value $P_{th}$ (Step S203: NO), the calibration control unit 630 continues monitoring of a value measured by the intensity measuring unit 640. On the other hand, if the incoming light intensity of the light-receiving element 430 exceeds the threshold value $P_{th}$ (Step S203: YES), the calibration control unit 630 calculates the position of the compensating member 310 at the time point (Step S204).

The calibration control unit 630 calculates the position of the compensating member 310 according to the drive amount of the driving unit 320 based on a command generated by the calibration control unit 630 itself. The calibration control unit 630 stores, in the storage unit 650, the thus-calculated position of the compensating member 310 as the calibrated initial position of the compensating member 310 (Step S205).

With the above-described series of operations, the calibrated initial position is retained in the storage unit 650. Therefore, when the distance measuring apparatus 13 starts the distance measurement operation, first, the driving unit 320 is caused to operate, and the compensating member 310 is moved to the initial position. Thereby, the distance measuring apparatus 13 can execute the distance measurement operation in a calibrated state.

Note that when a calibration value is acquired as in the above-described manner, the calibration control unit 630 may further continue scanning with signal light, and confirm that the light intensity measured by the intensity measuring unit 640 has changed into a state where it does not exceed the threshold $P_{th}$ again. Furthermore, the calibration control unit 630 may repeat scan with signal light and calculation of the calibrated position until it receives an instruction for termination from outside. On the other hand, the calibration control unit 630 may autonomously end the calibration operation at a time point where the calibration value is acquired.

In this manner, because the distance measuring apparatus 13 is provided with the calibrating unit 600 to execute the calibration operation by displacing the compensating member 310, not only calibration before shipment becomes easy, but also calibration can be executed easily after shipment. Therefore, for example, furthermore, when the distance measuring apparatus 11 is turned on, calibration operation may be executed or recommended as part of initialization. Also, the timing at which the calibration operation is executed may depend on an instruction from outside such as the user. Furthermore, the calibration control unit 630 may notify the user at every predetermined time interval.

Figure 27:
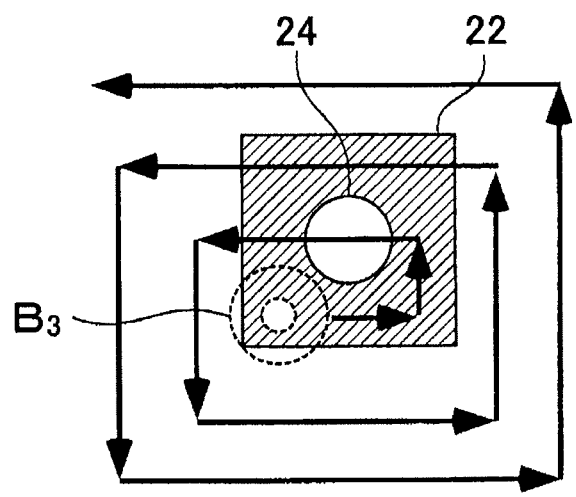
FIG. 27 is a schematic view for explaining scanning with signal light by the calibrating unit 600.

FIG. 27 is a schematic view for explaining scanning with signal light by the calibrating unit 600. In the example shown in FIG. 24, the position of the compensating member 310 when signal light is projected onto the high reflectance region 24 of the standard target object 22 is detected by performing scanning with reciprocating signal light in the field of view of the sighting unit 100.

However, the scan pattern of signal light in the calibration operation is not limited to reciprocating movement. For example, as shown in FIG. 27, the high reflectance region 24 may be searched for by performing scanning with a spiral scan pattern. Furthermore, when the distance measuring apparatus 13 has already been calibrated before, scanning with the spiral scan pattern may be started from a starting point which is the calibrated position specified by the most recent calibration operation.

Figure 28:
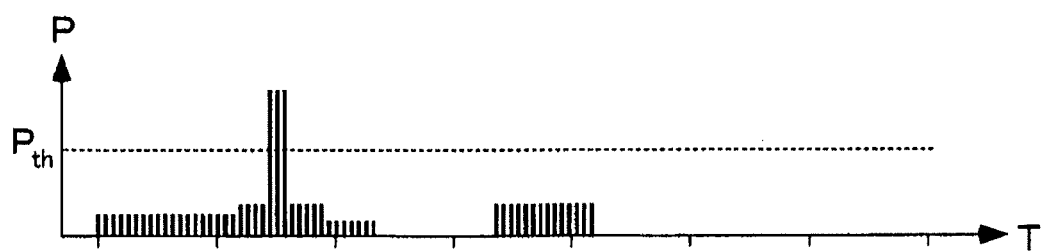
FIG. 28 is a graph showing incoming light intensity of the light-receiving element 430.

FIG. 28 is a graph showing changes in the incoming light intensity in the light-receiving element 430 detected when scanning with signal light is performed by using the above-described scan pattern. As illustrated, the high reflectance region 24 can be detected earlier and time required for the calibration operation can be made shorter by performing scanning spirally from the calibrated position that has already been specified.

Figure 29:
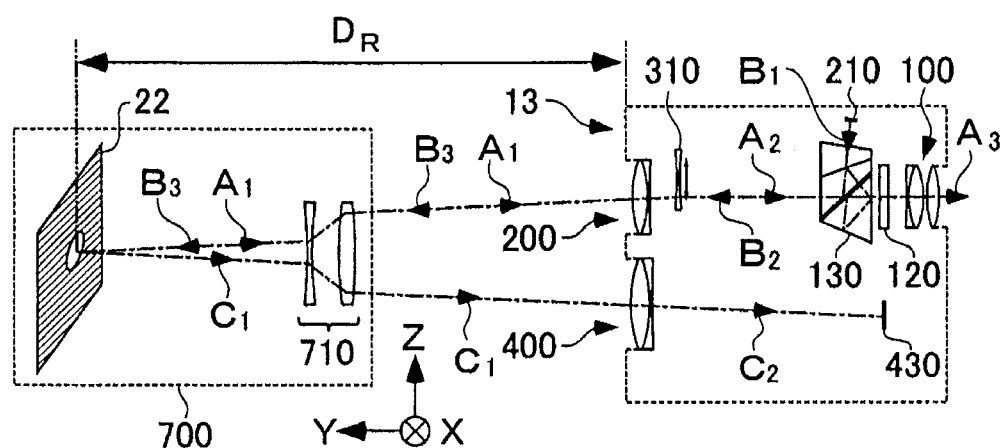
FIG. 29 is a schematic view of an auxiliary member 700.

FIG. 29 is a schematic view of an auxiliary member 700 that can be used when the distance measuring apparatus 13 is caused to execute the calibration operation of the distance measurement accuracy and the distance measurement range. The auxiliary member 700 has an auxiliary optical system 710 and the standard target object 22.

The auxiliary optical system 710 can cause the standard target object 22 observed through the object optical system 220 to look as if it is located farther away from its actual position. Therefore, by using the auxiliary member 700, the calibration operation can be executed without installing the standard target object 22 in the distance measurement range of the distance measuring apparatus 13 that can be as long as several hundred meters to one kilometer or longer.

Figure 30:
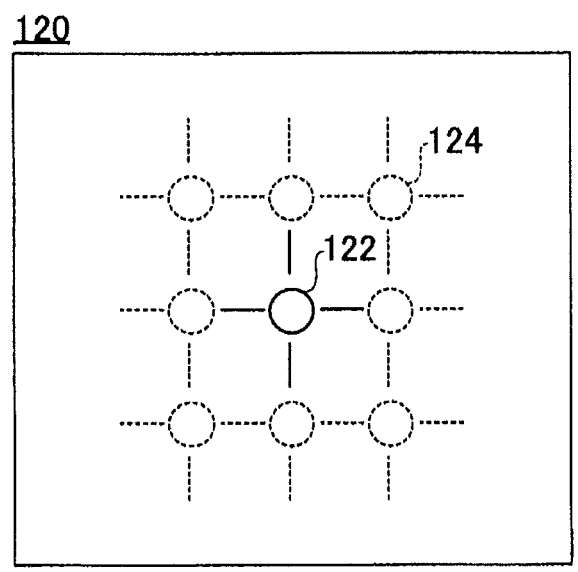
FIG. 30 is a schematic view of a reticle plate 120.

FIG. 30 is a schematic view of the reticle plate 120. The illustrated reticle plate 120 is formed with a transmissive liquid crystal display panel or the like that has a plurality of pixels. This reticle plate 120 can selectively display any (122) of a plurality of reticles 122, 124 located at different positions by displaying part of the plurality of pixels.

Thereby, displacement between the projection position of signal light by the light-transmitting unit 200 and the position of the reticle 122 in the field of view of the sighting unit 100 can be compensated. Also, when any of the calibrating unit 600 and the compensating unit 300 cannot completely calibrate or compensate the optical system in the moving range of the compensating member 310, compensation can be performed by moving the reticle 122. Note that the optical adjustment range of the distance measuring apparatus 13 may further be expanded by further making the light-emitting unit 210 movable.

In the above-described manner, when the reticle plate 120 has the movable reticle 122, it is possible to match the projection position of signal light with the reticle 122 without adjusting the optical system of the distance measuring apparatus 13. Therefore, a method of easily calibrating the position of the reticle 122 before and after shipment of the distance measuring apparatus 13 can be provided.

For example, before shipment of the distance measuring apparatus 13, the position of the reticle 122 can be adjusted by using calibration equipment provided with the light-receiving element. In other words, the reticle 122 is matched with the position of the light-receiving unit in the field of view of the sighting unit 100 after causing the light-receiving element to receive signal light emitted from the light-transmitting unit 200 through a collimation optical system. Thereby, the reticle 122 can be matched with the projection position of the signal light.

Also, when calibration equipment external to the distance measuring apparatus 13 cannot be utilized, first, signal light is projected while displacing the compensating member 310 in the light-transmitting unit 200. Next, the position of the compensating member 310 in a case where the signal light is received at the center of the light-receiving region 431 in the light-receiving element 430 is specified. The displacement amount between the projection position of the signal light and the reticle 122 can be calculated based on the thus-obtained displacement amount of the compensating member 310. Therefore, the reticle 122 can be matched with the projection position of the signal light by moving the position of the reticle 122 so as to cancel out the displacement amount of the compensating member 310.

Note that the shape of the reticle 122 formed in the reticle plate 120 is of course not limited to the illustrated one, and the shape of the reticle 122 may be various shapes such as a cross, a rectangle, a scale-shape or the like. Also, when a member having a dot-matrix display function such as a liquid crystal display panel is used as the reticle plate 120, the shape, size or the like of the reticle 122 may be changed in addition to its position.

Also, an example in which, in the distance measuring apparatus 13, the calibrating unit 600 is formed by using the compensating member 310 and the driving unit 320 provided on the light-transmitting unit 200 side was explained. However, as illustrated in FIG. 16, the calibrating unit 600 can be formed in the distance measuring apparatus 11 in which the compensating members 310, 312, and the driving units 320, 322 are provided in both the light-transmitting unit 200 and the light-receiving unit 400. In this case, the calibration operation may be executed on both the light-transmitting unit 200 side and the light-receiving unit 400 side, and the calibration operation may be executed on either of them. Furthermore, as illustrated in FIG. 18, the calibrating unit 600 can be formed even in the distance measuring apparatus 12 in which the compensating member 312 and the driving unit 322 are provided only to the light-receiving unit 400.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

DESCRIPTION OF REFERENCE NUMERALS 10, 11, 12, 13: distance measuring apparatus; 20: target object; 22: standard target object; 24: high reflectance region; 100: sighting unit; 110: eyepiece optical system; 120: reticle plate; 122, 124: reticle; 130: erecting prism; 132: dichroic reflection surface; 134, 136: total reflection surface; 200: light-transmitting unit; 210: light-emitting unit; 220, 410: object optical system; 300, 301, 302: compensating unit; 310, 312: compensating member; 320, 322: driving unit; 330: compensation control unit; 340: shake detection unit; 400: light-receiving unit; 420: band transmitting filter; 430: light-receiving element; 431: light-receiving region; 432, 434, 436: spot image; 433, 435: diffusion region; 500: distance measuring unit; 510: clock unit; 520: distance-measurement control unit; 530: display unit; 600: calibrating unit; 630: calibration control unit; 640: intensity measuring unit; 650: storage unit; 700: auxiliary member; 710: auxiliary optical system

What is claimed is:

1. A distance measuring apparatus comprising:
   a light-transmitting unit that transmits signal light from a light source toward a target object along a first optical path;
   a light-receiving unit that has a light-receiving element and receives the signal light from the target object on a second optical path different from the first optical path of the light-transmitting unit;
   a distance measuring unit that measures a distance to the target object based on propagation time from light transmission to light reception of the signal light; and
   a compensating unit that, while the second optical path of the light-receiving unit is fixed, compensates an optical path of the signal light by displacing the first optical path of the light-transmitting unit,
   wherein the compensating unit displaces the first optical path of the light-transmitting unit in a range within which the light-receiving element receives the signal light.

2. The distance measuring apparatus according to claim 1, wherein when the first optical path of the light-transmitting unit is located at a center of a displacement range, the light-receiving element receives the signal light at or near an intersection with a plane including an optical axis of the light-transmitting unit and an optical axis of the light-receiving unit within a light-receiving range.

3. The distance measuring apparatus according to claim 1, comprising a notifying unit that notifies that the first optical path of the light-transmitting unit cannot be compensated even by displacing the first optical path of the light-transmitting unit to a limit when such an event has occurred.

4. The distance measuring apparatus according to claim 3, wherein the notifying unit notifies that the displaced first optical path of the light-transmitting unit has approached a limit of a displacement range.

5. The distance measuring apparatus according to claim 1, wherein compensation by displacing the first optical path of the light-transmitting unit is terminated during a period in which an amplitude of displacement of the first optical path of the light-transmitting unit exceeds a range that allows compensation by displacement of the first optical path of the light-transmitting unit.

6. The distance measuring apparatus according to claim 1, wherein the compensating unit has a regulating unit that mechanically regulates a range within which the first optical path of the light-transmitting unit is displaced.

7. The distance measuring apparatus according to claim 1, wherein the compensating unit compensates a parallax between the light-transmitting unit and the light-receiving unit by displacing the first optical path of the light-transmitting unit.

8. The distance measuring apparatus according to claim 1, wherein the compensating unit compensates an image blur of the light-transmitting unit.

9. The distance measuring apparatus according to claim 7, wherein the compensating unit displaces the first optical path of the light-transmitting unit more when an amplitude of a shake in the light-transmitting unit exceeds a predetermined threshold.

10. The distance measuring apparatus according to claim 7, wherein the compensating unit displaces the first optical path of the light-transmitting unit more when the distance to the target object is shorter than a predetermined threshold.

11. The distance measuring apparatus according to claim 1, wherein the compensating unit displaces the first optical path of the light-transmitting unit based on incoming light intensity, in the light-receiving unit, of the signal light reflected on the target object.

12. The distance measuring apparatus according to claim 11, wherein the compensating unit displaces a compensating member and displaces the first optical path of the light-transmitting unit in a direction in which intensity of the signal light received by the light-receiving element becomes higher.

13. The distance measuring apparatus according to claim 11, wherein the compensating unit compensates the first optical path of the light-transmitting unit by calibrating each initial position of the first optical path of the light-transmitting unit and the second optical path of the light-receiving unit, and displacing the first optical path of the light-transmitting unit from the calibrated initial position of the first optical path of the light-transmitting unit based on incoming light intensity, in the light-receiving unit, of the signal light reflected on a known standard target object.

14. The distance measuring apparatus according to claim 13, wherein the compensating unit performs scanning with the signal light by using an initial position that has been calibrated most recently as a starting point.

15. The distance measuring apparatus according to claim 13, wherein the compensating unit calibrates and updates each initial position of the first optical path of the light-transmitting unit and the second optical path of the light-receiving unit upon receiving an instruction from outside.

16. The distance measuring apparatus according to claim 11, further comprising
   a sighting unit that allows the target object to be viewed and sights the light-transmitting unit,
   wherein the compensating unit calibrates a position of the first optical path of the light-transmitting unit relative to a reticle to be adjusted to the target object in the sighting unit.

17. The distance measuring apparatus according to claim 16, wherein the reticle is formed with a display image selected from among a plurality of images and displayed on a display unit.

18. The distance measuring apparatus according to claim 1, wherein the compensating unit terminates displacement of the first optical path of the light-transmitting unit when the signal light exceeds a range within which the light-receiving element can receive the signal light by the displacement of the first optical path of the light-transmitting unit.

19. The distance measuring apparatus according to claim 18, wherein the distance measuring unit remains measuring the distance after the compensating unit terminates the displacement of the first optical path of the light-transmitting unit.

20. A calibration method for calibrating a distance measuring apparatus including: a light-transmitting unit that transmits signal light from a light source toward a target object along a first optical path; a light-receiving unit that has a light-receiving element and receives the signal light from the target object on a second optical path different from the first optical path of the light-transmitting unit; a distance measuring unit that measures a distance to the target object based on propagation time from light transmission to light reception of the signal light; and a compensating unit that, while the second optical path of the light-receiving unit is fixed, compensates an optical path of the signal light by displacing the first optical path of the light-transmitting unit, the method comprising:

measuring incoming light intensity, in the light-receiving unit, of the signal light reflected on a known standard target object while displacing the first optical path of the light-transmitting unit;

displacing the first optical path of the light-transmitting unit in a range within which the light-receiving element receives the signal light; and deciding each initial position of the first optical path of the light-transmitting unit and the second optical path of the light-receiving unit by displacing the first optical path of the light-transmitting unit.

* * * * *